(12) United States Patent
Prabhu et al.

(10) Patent No.: US 11,727,394 B2
(45) Date of Patent: Aug. 15, 2023

(54) SYSTEMS AND METHODS FOR MANAGING ELECTRONIC TRANSACTIONS

(71) Applicant: PAYPAL, INC., San Jose, CA (US)

(72) Inventors: Nitin Prabhu, San Jose, CA (US); Meghna Singh, Santa Clara, CA (US); John Michael Box, Harpenden (GB); Avik Chatterjee, Phoenix, AZ (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/313,890

(22) Filed: May 6, 2021

(65) Prior Publication Data

US 2022/0207521 A1 Jun. 30, 2022

Related U.S. Application Data

(63) Continuation of application No. 17/135,370, filed on Dec. 28, 2020.

(51) Int. Cl.
*G06Q 20/36* (2012.01)
*G06Q 20/06* (2012.01)
(Continued)

(52) U.S. Cl.
CPC ..... *G06Q 20/3678* (2013.01); *G06Q 20/0658* (2013.01); *G06Q 20/102* (2013.01);
(Continued)

(58) Field of Classification Search
CPC .......................................... G06Q 20/30–3678
(Continued)

(56) References Cited

U.S. PATENT DOCUMENTS

| 6,128,603 A | 10/2000 | Dent et al. |
| 2002/0062249 A1* | 5/2002 | Iannacci ............. G06Q 20/105 705/14.1 |

(Continued)

FOREIGN PATENT DOCUMENTS

| JP | 2001028026 A | * | 1/2001 | |
| WO | WO-9623283 A2 | * | 8/1996 | ............. G06Q 20/28 |

(Continued)

OTHER PUBLICATIONS

International Search Report and Written Opinion dated May 16, 2022 in International Application No. PCT/US2021/065025, 10 pages.

(Continued)

*Primary Examiner* — James D Nigh
*Assistant Examiner* — Jeffrey L Licitra
(74) *Attorney, Agent, or Firm* — Haynes and Boone, LLP

(57) ABSTRACT

Methods and systems are presented for providing comprehensive payment transaction services through a digital wallet. The digital wallet enables a user to conduct an electronic transaction with a merchant or another user. In one aspect, the digital wallet may modify a payment arrangement of the electronic transaction. For example, the digital wallet may determine a first payment arrangement that specifies one or more financial instruments and a payment deferral time period for the electronic transaction. Subsequent to processing the electronic transaction, the digital wallet may determine a different, second payment arrangement for the electronic transaction. The digital wallet may modify the electronic transaction based on the second payment arrangement without canceling the electronic transaction. In another aspect, the digital wallet may manage rewards by dynamically withholding rewards, releasing the rewards, and/or distributing at least portions of the rewards to different users.

20 Claims, 11 Drawing Sheets

(51) Int. Cl.
  *G06Q 20/10* (2012.01)
  *G06Q 20/40* (2012.01)
  *G06Q 30/0207* (2023.01)
(52) U.S. Cl.
  CPC ....... *G06Q 20/3676* (2013.01); *G06Q 20/405* (2013.01); *G06Q 30/0215* (2013.01)
(58) Field of Classification Search
  USPC .......................................................... 705/69
  See application file for complete search history.

(56) References Cited

U.S. PATENT DOCUMENTS

| | | | |
|---|---|---|---|
| 2009/0112661 A1 | 4/2009 | Mullen et al. | |
| 2009/0119190 A1* | 5/2009 | Realini | G06Q 20/3265 705/37 |
| 2009/0319425 A1* | 12/2009 | Tumminaro | G06Q 20/425 705/42 |
| 2010/0036770 A1 | 2/2010 | Fourez et al. | |
| 2010/0274678 A1* | 10/2010 | Rolf | G06Q 20/20 705/17 |
| 2013/0275300 A1 | 10/2013 | Killian et al. | |
| 2013/0325680 A1* | 12/2013 | Satyavolu | H04M 15/8044 705/35 |
| 2014/0164157 A1 | 6/2014 | Fisher | |
| 2014/0279487 A1 | 9/2014 | Poole | |
| 2017/0308875 A1* | 10/2017 | O'Regan | G06Q 20/102 |
| 2018/0253722 A1* | 9/2018 | Gupta | G06Q 40/025 |
| 2018/0293573 A1* | 10/2018 | Ortiz | G06Q 20/20 |
| 2019/0228430 A1* | 7/2019 | Givol | G06Q 20/387 |
| 2019/0362339 A1* | 11/2019 | Gurunathan | G06Q 20/3674 |
| 2020/0065783 A1* | 2/2020 | Fernandes | G06Q 20/20 |
| 2020/0250668 A1* | 8/2020 | Mukherjee | G06Q 20/32 |
| 2020/0380495 A1 | 12/2020 | Kang | |
| 2021/0049565 A1 | 2/2021 | Anderson et al. | |
| 2021/0073777 A1 | 3/2021 | Bialick | |

FOREIGN PATENT DOCUMENTS

| | | |
|---|---|---|
| WO | WO 2020086096 | 4/2020 |
| WO | WO-2020086096 A1 * | 4/2020 |
| WO | WO-2020094874 A1 * | 5/2020 |

OTHER PUBLICATIONS

Office Action, U.S. Appl. No. 17/135,370, dated Jan. 5, 2023, 18 pages.

\* cited by examiner

SYSTEMS AND METHODS FOR MANAGING ELECTRONIC TRANSACTIONS

CROSS REFERENCE TO RELATED APPLICATIONS

The present application is a continuation of U.S. patent application Ser. No. 17/135,370, filed on Dec. 28, 2020, all contents of which are hereby incorporated by reference in their entirety.

BACKGROUND

The present specification generally relates to digital data processing, and more specifically, to providing dynamic management and adjustment on electronic transactions according to various embodiments of the disclosure.

Related Art

Advancements in electronic devices have enabled electronic transactions to be conducted quickly and conveniently. For example, using a digital wallet application, a user may store information associated with different financial instruments (e.g., various bank accounts, credit cards, debit cards, gift cards, etc.) that are associated with the user. The user may then use the mobile device to conduct an electronic transaction, that includes payment of goods or services purchased in the transaction, by selecting any one of the financial instrument stored in the digital wallet application. The electronic transaction may be conducted with a physical merchant store (e.g., through a point-of-sale device using a mobile payment transaction processing protocol such as Apple Pay®, Google Pay®, etc.) or an online merchant store. In some instances, a digital wallet application may even have the intelligence to automatically select or suggest a payment arrangement (e.g., which financial instrument to use, what financial terms, etc.) for conducting the electronic transaction for the user.

While many technologies have been developed in providing assistance and flexibility of conducting electronic transactions, once an electronic transaction is completed, the user has little or no control over the electronic transaction. Thus, there is a need for developing a framework that provides dynamic management of adjustments to electronic transactions after the transactions are completed.

Figure 1:
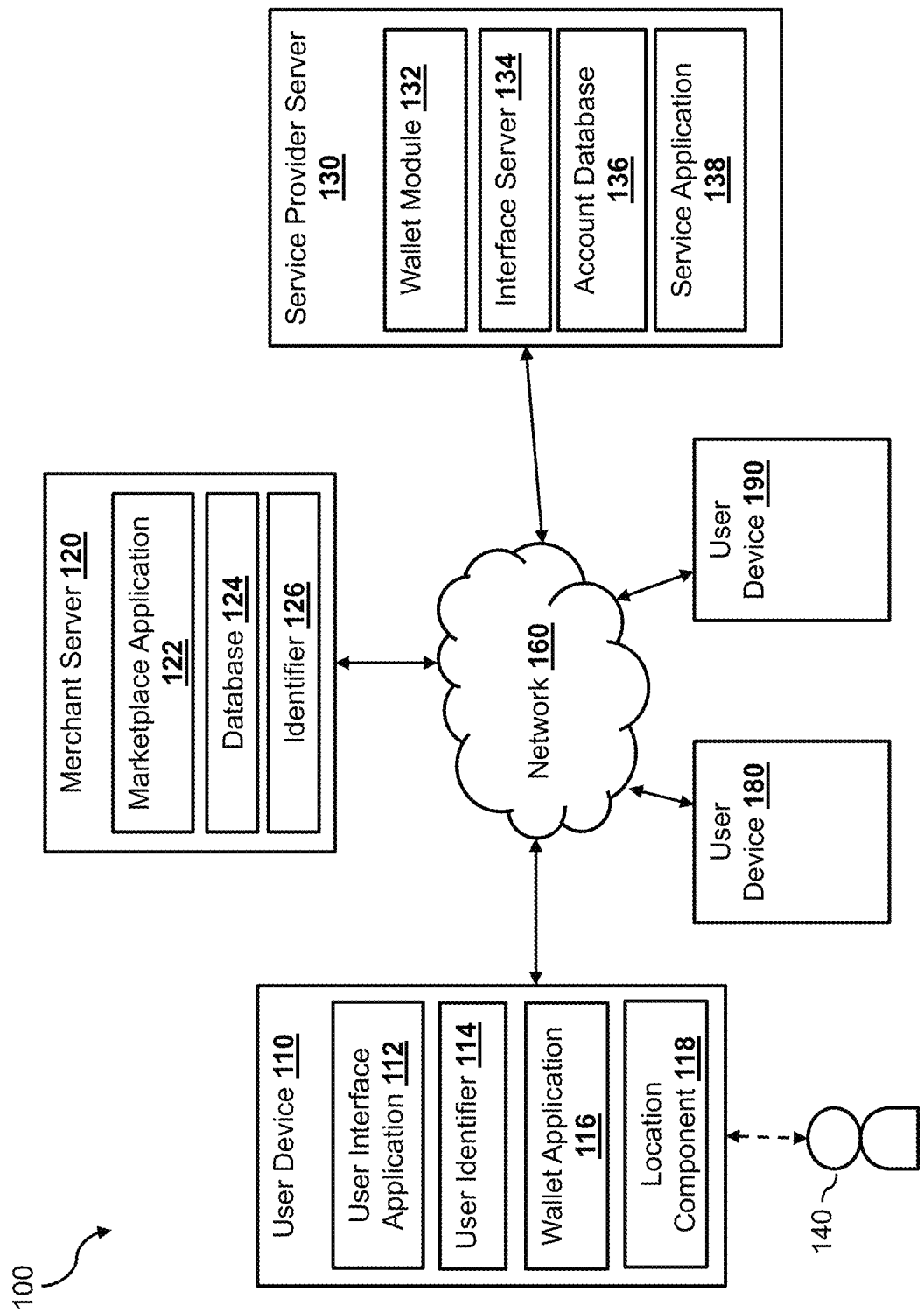
FIG. 1 is a block diagram illustrating a networked system that includes an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure includes methods and systems for providing comprehensive electronic transaction services. In some embodiments, an electronic transaction system may provide assistance and services to users for electronic transactions before the electronic transactions are conducted, during processing of the transactions, and after the electronic transactions are processed. For example, the electronic transaction system may provide users with one or more payment tools for conducting electronic transactions with merchants. The payment tool may come in various forms. In some embodiments, the payment tool may include a physical payment card. The physical payment card may have a magnetic stripe and/or an EMV chip. A user may use the physical payment card to conduct an electronic transaction at a physical merchant store by using the physical payment card to interact with a point-of-sale (POS) device (e.g., a magnetic stripe reader, an EMV chip reader, etc.) of a merchant. As used herein, "electronic transactions" include payments for purchase of physical goods, services, or digital content from a transaction conducted, at least in part, through digital data transmission and processing.

The payment tool may also include a wallet application that can be executed on a user device of the user. The wallet application may be configured to conduct online transactions by transmitting payment information (e.g., financial data associated with a financial instrument, etc.) to a merchant server over a network. In some embodiments, the wallet application may also be configured to conduct an electronic transaction with a point-of-sale (POS) device of a merchant by transmitting the payment information to the POS device using a short-range wireless communication protocol such as Bluetooth®, Near-Field Communication, or infrared.

The electronic transaction system may enable a user to register a user account (also referred to as a "digital wallet account") through a user interface (e.g., via a website, a mobile application, etc.) of the electronic transaction system. Through the user interface, the user may link one or more financial instruments (e.g., one or more bank accounts, one or more credit cards, debit cards, gift cards, reward cards, etc.) to the user account by providing information associated with the one or more financial instruments (e.g., card number, expiration date, security code, etc.). The electronic transaction system may then store the information in a data storage associated with the user account (e.g., in a record of a database associated with the user account) and/or within the payment tool (in a memory of the user device associated with the wallet application, in a memory embedded within the physical payment card, etc.). After linking the financial instrument(s) to the user account, the user may conduct electronic transactions using the payment tool provided by the electronic transaction system. For example, the user may use the physical card or the wallet application provided the electronic transaction system to make a purchase at a physical store (e.g., by swiping the physical card along a POS device of the merchant, by inserting the physical card to an EMV chip reader, by placing the user device within a distance of a POS device of the merchant, etc.) or at an online store.

Since multiple financial instruments can be linked to the user account of the user, in some embodiments, the electronic transaction system may select (or enable the user to select) a payment arrangement based on the financial instruments linked to the user account for conducting the electronic transaction. The payment arrangement may include a financial instrument, or a combination of financial instruments, selected from the financial instruments linked to the user account. When multiple financial instruments are selected for the electronic transaction, the payment arrangement may include allocations from each selected financial instrument toward the amount of the payment transaction. The payment arrangement may also specify a payment deferral arrangement, which represents a period of time (e.g., 5 hours, 1 day, 21 days) from conducting the electronic transaction for the user to pay for the electronic transaction, even when the financial instrument selected for the electronic transaction is not a credit-based financial instrument (e.g., a credit card). To enable the payment deferral arrangement, the electronic transaction system may provide the necessary credits to the user for paying the electronic transaction (e.g., a purchase) until the period of time expires (then the financial instrument of the user is charged for the amount of the electronic transaction).

In some embodiments, the electronic transaction system may provide an interface to the user that enables the user to select the payment arrangement for the electronic transaction. For example, upon receiving a request for conducting an electronic transaction, the wallet application may present a list of the financial instruments that are linked to the user account on a user interface of the wallet application and may enable the user to select one or more of the financial instruments from the list. The physical payment card may include a display (e.g., a touch screen display) that presents the list of financial instruments and enables the user to select one or more financial instruments from the list. The interface of the payment tool may also enable the user to select a period of time if the user selects a delayed payment arrangement (e.g., instant pay, delayed for 3 days, for 21 days, etc.). The user may then select one or more financial instruments and/or a delayed payment arrangement for conducting the electronic transactions via the interface of the payment tool.

When the user selects more than one financial instrument on the interface provided by the payment tool, the electronic transaction system may determine an allocation of an amount associated with the electronic transaction for each of the selected financial instruments. In some embodiments, the electronic transaction system may allocate the amount associated with the electronic transaction evenly among the selected financial instruments (e.g., 50% to each of two selected financial instruments, 33.3% to each of three selected financial instruments, etc.). In some embodiments, the electronic transaction system may determine the allocations for the selected financial instruments based on a transaction history of the user account (e.g., how amounts in previous transactions are allocated to different financial instruments, etc.). In some embodiments, the payment tool may enable the user to specify the allocations of the selected financial instruments via the interface provided by the payment tool.

In some embodiments, the electronic transaction system may determine (or suggest) a payment arrangement for the electronic transaction based on one or more factors, such as payment history of the user account, rewards associated with using the financial instruments, anticipated/expected future expenses and income, and other factors. For example, upon receiving a request for conducting an electronic transaction, the electronic transaction system may analyze information associated with the electronic transaction, such as an amount, an identity of the payee (e.g., a merchant, a friend, etc.), a purchase type (e.g., grocery, clothing, dining, travel, etc.), and other information. The electronic transaction system may determine an optimal payment arrangement (which may include one or more financial instruments, allocations, and delayed payment arrangement) based on the information associated with the electronic transaction in view of the one or more factors.

For example, the electronic transaction system may access information (e.g., rewards information) associated with the different financial instruments (e.g., by accessing servers associated with the issuer banks of the financial instruments, etc.), and determine the optimal financial instrument or financial instrument combination for the electronic transaction that would yield the maximum rewards for the user. In some embodiments, the user may provide the electronic transaction system additional information such as a ranking of the types of rewards (e.g., the user may rank cashback rewards higher than travel credit, etc.). The user may provide weights for each type of reward. The user may also provide a goal (e.g., getting a threshold amount of travel rewards by a predetermined time frame, etc.). The electronic transaction system may analyze the rewards that the user would receive using different financial instruments (and different combinations of financial instruments) and may determine a payment arrangement for the electronic transaction that would yield the maximum rewards for the user based on the user's preferences.

In some embodiments, the electronic transaction system may determine an optimal delayed payment arrangement for the electronic transaction for the user. The electronic transaction system may offer incentives (e.g., rewards, cashback, etc.) for the user to pay immediately. Thus, the electronic transaction system may balance the incentives against the financial condition of the user account, such as a balance, a liability, and anticipated future expenses and/or income. For example, if the electronic transaction system detects an anticipated income in the near future (e.g., within a few days, etc.) based on a recurring incoming fund transfer or an anticipated release of funds from a recent sale, etc., the electronic transaction system may delay the payment of the current electronic transaction until after the future funds are available to improve the cash flow of the user account (especially if the balance of the user account is low such as below the amount of the electronic transaction). In another example, if the electronic transaction system detects an imminent expense in the near future (e.g., within a few days), the electronic transaction system may determine an installment payment plan to delay paying for the electronic transaction.

The electronic transaction system may automatically perform (e.g., via the payment tool) the electronic transaction using the determined payment arrangement. The electronic transaction system may also present the determined payment arrangement on the interface of the payment tool. The user may then confirm the use of the determined payment arrangement for the electronic transaction or edit the payment arrangement via the interface.

The payment tool may initiate the electronic transaction. For example, the payment tool may initiate the electronic transaction by communicating the financial data of the selected financial instrument(s) (and the payment allocations) to a merchant device (e.g., a POS device, a merchant web server, etc.). In some embodiments, instead of providing the financial data of the selected financial instrument to the merchant device, the payment tool may generate and communicate a token associated with the user account to the merchant device. The token may include information associated with the electronic transaction system and the user account. For example, the token may mimic the format of a credit card or debit card data structure (e.g., Track 1 and Track 2 data structure). Instead of a credit card number, the payment tool and/or the electronic transaction system may generate the token to include an identifier that identifies a server associated with the electronic transaction system and the user account of the user. Since the token has the same format of a credit card or a debit card, the merchant device may accept the token and process the electronic transaction by transmitting the token to a payment network.

In some embodiments, the payment network is a private (closed) network that connects financial institutions involved in a payment process (e.g., various acquirer banks, issuer banks, and institutions that facilitate the payment process, such as the server of the payment transaction system, merchant servers, etc.). The payment network is accessible only by those institutions and not by the general public. Furthermore, communication transmitted within the payment network is provided with enhanced security such as encryption and digital signature, which enables sensitive data such as financial data to be transmitted securely. Data that is transmitted within the payment network is generally more secured than data that is exposed to a public network such as the Internet.

When the merchant device receives the token from the payment tool, the merchant device may transmit the token to the payment network to process the electronic transaction. Based on the identifier included in the token, the token may be routed, within the payment network, to the server of the electronic transaction system. The payment tool may also transmit transaction data associated with the electronic transaction (e.g., items being purchased, an amount, a merchant identifier, etc.) and the payment arrangement to a server of the electronic transaction system via a network different from the payment network, such as the Internet. When the server receives the token via the payment network, the electronic transaction system may then use the information received from the payment tool to process the electronic transaction. For example, the electronic transaction system may transmit financial data of the selected financial instruments to the corresponding acquirer banks through the payment network according to the allocations to process the one or more payments. When the server of the electronic transaction system receives corresponding confirmations from the acquirer banks via the payment network, the server of the electronic transaction system may transmit a transaction processing successful message to the merchant server, indicating that the electronic transaction is completed.

The use of the tokens gives rise to additional benefits. For example, since the electronic transaction is routed back to the electronic transaction server, the user and/or the payment tool may not need to determine a payment arrangement at the time the electronic transaction is conducted. In some embodiments, as the token is received by the electronic transaction system via the payment network, the electronic transaction system may create a receivable record in association with the transaction. The receivable record indicates that the transaction has been entirely allocated to the user account of the electronic transaction system. The electronic transaction system may transmit a transaction complete message back to the merchant indicating that the electronic transaction is completed, even though no funds have been charged to any of the financial instruments associated with the user. Instead, the electronic transaction is initially paid for by the electronic transaction system or on the credit of the electronic transaction system.

In some embodiments, the electronic transaction system may enable a payment arrangement to be determined after the transaction has been completed. The user and/or the electronic transaction system may determine a payment arrangement for the transaction using the techniques described herein for one or more re-payment transactions (e.g., charging one or more financial instruments of the user to pay back the electronic payment system. After the payment arrangement is determined, the electronic transaction system may communicate with various financial institutions (e.g., issuer banks, acquirer banks, etc.) within the payment network to charge funds from the one or more financial institutions specified in the payment arrangement in order to process the re-payment transactions. Since these re-payment transactions are associated with the receivable transaction record, the electronic transaction system may retrieve data from the receivable transaction record (e.g., MCC code, purchase category such as grocery, merchant identifier, etc.) such that the financial institutions may process any rewards (e.g., rewards associated with particular merchants or purchase categories, etc.) properly.

In some embodiments, the electronic transaction system may modify the payment arrangement used for the electronic transaction after the electronic transaction is completed. The modification of the payment arrangement may include selecting one or more different financial instruments (or selecting different allocations for the financial instruments) for use in the electronic transaction. For example, when a first set of financial instruments (e.g., a VISA credit card) was selected to use for the electronic transaction when the electronic transaction was conducted, the electronic transaction system may modify the electronic transaction to use a different set of financial instruments, such as a second set of financial instruments (e.g., an American Express credit card, a debit card, a gift card, etc.). In another example, the electronic transaction system may modify the electronic transaction to use multiple financial instruments instead of a single financial instrument, or vice versa.

In yet another example, the electronic transaction system may modify the electronic transaction by adjusting the allocations for the selected financial instruments (e.g., changing the allocation of the amount for one or more of the selected financial instruments). In some embodiments, the modification may also include adjusting the delayed payment arrangement (e.g., increasing or decreasing the time period before the user has to pay for the electronic transaction).

The ability to modify the payment arrangement used in an electronic transaction after the electronic transaction is conducted provides many benefits to the user and the payment process. For example, while conducting the electronic transaction (e.g., making the purchase at a physical store or through an online store) or immediately prior to conducting the electronic transaction, the user may not have sufficient time or knowledge to determine an optimal payment arrangement (e.g., which financial instrument(s) provide the optimal rewards for the user based on the purchase). As such, the user may not select the optimal financial instrument(s) at the time the electronic transaction is conducted. As discussed above, the electronic transaction system, through the payment tool, may be configured to suggest an optimal payment arrangement for the electronic transaction based on factors such as an amount of the electronic transaction, a type of purchase (e.g., grocery, clothing, dining, etc.), an identity of the merchant, anticipated expenses and/or income for the user account, etc. However, a user device of the user may not have access to the electronic transaction system when the electronic transaction is conducted (e.g., unavailable or limited connectivity to a network, etc.). Thus, the user may not have the ability to determine the optimal payment arrangement for use in the electronic transaction at the time the electronic transaction is conducted.

Furthermore, even when the connectivity between the user device of the user and the electronic transaction system is available, the process of accessing information that can be used to determine the optimal payment arrangement and determining the optimal payment arrangement in real time may cause unnecessary stress to the electronic transaction system and may cause delay to the electronic transaction process. The ability to modify the payment arrangement after the electronic transaction is conducted, the electronic transaction system may perform the process of determining the optimal payment arrangement at a later time (e.g., not in real-time of conducting the electronic transaction) and therefore, can allocate the computing resources to perform more important tasks in processing electronic transactions. Thus, in some embodiments, when the electronic transaction system determines that the computing resources usage has exceeded a predetermined threshold, the electronic transaction system may conduct the electronic transaction using a predetermined default (e.g., a dummy) payment arrangement, such as using a predetermined financial instrument and a payment deferral arrangement that allows for maximum deferral time period. The electronic transaction system may then perform the process of determining an optimal payment arrangement after the electronic transaction is processed (e.g., when the computing resource usage has fallen below the threshold) and may modify the payment arrangement upon determining the optimal payment arrangement. It is noted that in the event that the payment transaction processing using the default payment arrangement (e.g., card declines, etc.), the electronic transaction system may automatically select a different payment arrangement (e.g., a different financial instrument) for the transaction, or automatically prompt the user to select an alternative payment arrangement for the transaction. It is noted that in the event that the payment transaction processing using the default payment arrangement (e.g., card declines, etc.), the electronic transaction system may automatically select a different payment arrangement (e.g., a different financial instrument) for the transaction, or automatically prompt the user to select an alternative payment arrangement for the transaction.

After the electronic transaction is conducted, the user may be able to determine the optimal financial instrument for use in the electronic transaction (e.g., the user has traveled to a location where connectivity to the electronic transaction system is available, the user has time to research on the rewards offered by different financial instruments, etc.). Thus, the electronic transaction system may modify the electronic transaction to use a different payment arrangement after the electronic transaction is conducted. The electronic transaction system may modify the electronic transaction automatically or based on instructions from the user through the user interface.

For example, after the electronic transaction is conducted, the electronic transaction system may determine whether the payment arrangement used for conducting the electronic transaction is optimal using the techniques described herein. If the financial instrument(s) selected for use in the electronic transaction is different from the financial instrument or financial instrument combination determined by the electronic transaction system, the electronic transaction system may transmit a notification to the user (e.g., a notification through the wallet application of the user device, an email, an SMS message, etc.) indicating that a more optimal financial instrument or financial instrument combination is available for the electronic transaction. The user may then confirm or further modify the payment arrangement for the electronic transaction via the user interface provided by the electronic transaction system.

In some embodiments, the modification of payment arrangement to the electronic transaction is transparent to the payee (e.g., the merchant) of the electronic transaction. In other words, the modification of the payment arrangement does not require any actions performed by the payee. When the electronic transaction is conducted, the electronic transaction system may transmit a confirmation to the payee, indicating that the electronic transaction is completed. Funds associated with the electronic transaction system may be transferred to the payee as if the electronic transaction is processed and completed under a normal operation. As such, the payee may not be aware of any modification to the electronic transaction after the electronic transaction is conducted. In some embodiments, the electronic transaction system may perform modifications to the payment arrangement of the electronic transaction by directly transmitting commands and/or instructions to the banking institutions within the payment network. For example, the electronic transaction system may communicate with various financial institutions within the payment network to charge the financial instruments specified in the modified payment arrangement and to cancel the charges applied to the financial instruments specified in the original payment arrangement.

In some embodiments, the electronic transaction system may offer incentives (e.g., in the form of rewards such as cashback or other types of rewards, etc.) to users for using the electronic transaction system to conduct payment transactions. Thus, one benefit for the user for using the electronic transaction system in conducting electronic transactions is the ability to obtain rewards from multiple parties, such as the merchant, the financial instrument(s), and the electronic transaction system. In another aspect of the disclosure, the electronic transaction system may be configured to manage the rewards associated with one or more user accounts. For example, when rewards are obtained from conducting payment transactions, the electronic transaction system may store information associated with the rewards (e.g., source of the rewards, an amount, how to redeem, etc.) in the database in association with the user account. The electronic transaction system may present the information associated with the rewards available to the user on the user interface such that the user may use the rewards through the user account (e.g., paying a future payment transaction using the rewards, etc.). In some embodiments, the user and/or the electronic transaction system may determine using the rewards, alone or with other financial instrument(s), as part of the payment arrangement for conducting an electronic transaction.

In some embodiments, the electronic transaction system may provide rewards splitting services for the user. In some instances, the user may desire to split the amount of an electronic transaction (e.g., the bill) associated with a merchant among multiple people. For example, during a dinner gathering with friends, the user may want the group of people in the gathering to contribute to the bill of the dinner gathering. The electronic transaction system of some embodiments may provide bill splitting services to the user. To facilitate a seamless bill splitting payment process, the electronic transaction system may assign a primary payor (e.g., the user) within the group that is responsible for performing the electronic transaction to the vendor. Thus, an electronic transaction in the full amount of the purchase is conducted through the user account for the merchant. The electronic transaction system may then facilitate additional electronic transactions for transferring funds corresponding to the respective contributing amount from user accounts associated with the other parties (e.g., the friends of the user) to the user account of the user.

When rewards (rewards from the financial instrument(s) used for conducting the payment transaction, rewards from the merchant, rewards from the electronic transaction system, etc.) are offered to the user based on the completion of the purchase, the electronic transaction system of some embodiments may manage (e.g., distribute) the rewards for the parties (e.g., the user and the friends during the dinner gathering) involved in the electronic transaction. For example, the electronic transaction system may determine a portion (e.g., a percentage) of the total amount in the purchase that each payor has contributed and assign the same portion of the reward to the payor. Thus, upon detecting that the user account has obtained the rewards, if it is determined that the rewards are associated with a purchase that is split among multiple users, the electronic transaction system may divide the rewards into the corresponding portions and transfer the different portions of the rewards from the user account of the user to user accounts of the other payors.

While some rewards (e.g., cashback rewards, points, etc.) can be divided and distributed among multiple user accounts, other rewards (e.g., an incentive associated with a future purchase such as a coupon for a free item and/or a discount in the next purchase) cannot be easily divided and/or distributed to multiple user accounts. In such instances, the electronic transaction system may initially withhold the rewards in the user account from use by the user. For example, the electronic transaction system may tag the rewards (e.g., adding a tag to the information associated with the rewards stored in the data storage) in the user account such that the electronic transaction system may prevent the user from using the rewards in electronic transactions in the future. The electronic transaction system may release the rewards for use under certain conditions. For example, in some embodiments, the electronic transaction system may release the rewards for use in electronic transactions when a user device of the user and the user device(s) of the other parties involved in the previous electronic transaction are within a predetermined distance from each other. Thus, the rewards that were obtained from a previous dinner gathering may be released and used in a subsequent gathering that involves the same parties. In some embodiments, the electronic transaction system may allow the user to use the tagged rewards through the user account upon receiving an authorization from the other user(s) who were involved in the previous electronic transaction. For example, the electronic transaction system may enable the user to select the tagged rewards on the payment tool for use in an electronic transaction. Upon receiving a selection of the tagged rewards, the electronic transaction system may send one or more authorization requests to user devices of the other user(s) involved in the previous electronic transaction. The other user(s) may authorize or reject the request through the interface presented on the user device(s). If authorization from all of the users are received, the electronic transaction system may authorize the use of the tagged rewards. On the other hand, if authorization from at least one of the other users is not received, the electronic transaction system may disallow the user from using the tagged rewards and may force the user to select another financial instrument for the current electronic transaction.

FIG. 1 illustrates a networked system 100, within which the electronic transaction system may be implemented according to one embodiment of the disclosure. Note that the present techniques may be applied in many different computing and technological environments, however, and are not limited to those shown in the figures. The networked system 100 includes a service provider server 130, a merchant server 120, and user devices 110, 180, and 190 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to conduct an online transaction with the merchant server 120 via websites hosted by, or mobile applications associated with, the merchant server 120 respectively. The user 140 may also log in to a user account to access account services or conduct electronic transactions (e.g., account transfers or payments) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the merchant server 120 and/or the service provider server 130 over the network 160. In one implementation, the user interface application 112 includes a software program (e.g., a mobile application) that provides a graphical user interface (GUI) for the user 140 to interface and communicate with the service provider server 130, and/or the merchant server 120 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include a wallet application 116 associated with the payment transaction system. The wallet application 116 may provide an interface to the user 140 to perform the payment functionalities disclosed herein. For example, the wallet application 116 may enable the user to initiate or be used in an electronic transaction. In response to receiving a request for a payment associated with an electronic transaction, the wallet application 116 may present a list of financial instruments that are linked to a user account of the user 140 and may enable the user 140 to select one or more financial instruments for conducting the electronic transaction. The wallet application 116 may also in communication with the service provider server 130 to determine a payment arrangement for the electronic transaction.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user 140 with a particular user account (e.g., and a particular profile) maintained by the service provider server 130.

The user device 110, in various embodiments, includes a location component 118 configured to determine, track, monitor, and/or provide an instant geographical location of the user device 110. In one implementation, the geographical location may include GPS coordinates, zip-code information, area-code information, street address information, and/or various other generally known types of location information. In one example, the location information may be directly entered into the user device 110 by the user via a user input component, such as a keyboard, touch display, and/or voice recognition microphone. In another example, the location information may be automatically obtained and/or provided by the user device 110 via an internal or external monitoring component that utilizes a global positioning system (GPS), which uses satellite-based positioning, and/or assisted GPS (A-GPS), which uses cell tower information to improve reliability and accuracy of GPS-based positioning. In other embodiments, the location information may be automatically obtained without the use of GPS. In some instances, cell signals or wireless signals are used. For example, location information may be obtained by checking in using the user device 110 via a check-in device at a location, such as a beacon. This helps to save battery life and to allow for better indoor location where GPS typically does not work.

In various implementations, the user 140 is able to input data and information into an input component (e.g., a keyboard) of the user device 110. For example, the user 140 may use the input component to interact with the digital wallet application 112 (e.g., to add a new funding account, to provide information associated with the new funding account, to initiate an electronic transaction, etc.).

Each of the user devices 180 and 190 may be associated with the same user 140 or different users and may include similar components as the user device 110 to perform the functions described herein. While only three user devices 110, 180, and 190 are shown in FIG. 1, it has been contemplated that more than three user devices, each associated with a different user, may be connected to the merchant server 120, the service provider server 130, via the network 160.

The merchant server 120, in various embodiments, may be maintained by a business entity (or in some cases, by a partner of a business entity that processes transactions on behalf of business entity). Examples of business entities include merchants, resource information providers, utility providers, real estate management providers, social networking platforms, etc., which offer various items for purchase and process payments for the purchases. As shown, the merchant server 120 may include a merchant database 124 for identifying available items, which may be made available to the user devices 110, 180, and 190 for viewing and purchase by the user.

The merchant server 120, in one embodiment, may include a marketplace application 122, which may be configured to provide information over the network 160 to the user interface application 112 of the user devices 110, 180, and 190. In one embodiment, the marketplace application 122 may include a web server that hosts a merchant website for the merchant. For example, the user 140 of the user device 110 may interact with the marketplace application 122 through the user interface application 112 over the network 160 to search and view various items available for purchase in the merchant database 124. The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

While only one merchant server 120 is shown in FIG. 1, it has been contemplated that multiple merchant servers, each associated with a different merchant, may be connected to the user device 110, the service provider server 130, and the remote servers 180 and 190 via the network 160.

The service provider server 130, in one embodiment, may be maintained by a transaction processing entity or an online service provider, which may provide processing for electronic transactions between the users of the user devices 110, 180, and 190, and one or more merchants or other types of payees. As such, the service provider server 130 may include a service application 138, which may be adapted to interact with the user devices 110, 180, and 190, and/or the merchant server 120 over the network 160 to facilitate the searching, selection, purchase, payment of items, and/or other services offered by the service provider server 130. In one example, the service provider server 130 may be provided by PayPal®, Inc., of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities (e.g., between two users, etc.). In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various service provided by the service provider server 130. The interface server 134 may also include other electronic pages associated with the different services (e.g., electronic transaction services, etc.) offered by the service provider server 130. As a result, a user (e.g., the user 140 or a merchant associated with the merchant server 120, etc.) may access a user account associated with the user and access various services offered by the service provider server 130, by generating HTTP requests directed at the service provider server 130. In some embodiments, the fragment module integration framework may be implemented within or in association with the interface server 134.

The service provider server 130, in one embodiment, may be configured to maintain one or more user accounts and merchant accounts in an account database 136, each of which may be associated with a profile and may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 includes a payment transaction module 132 that implements the electronic transaction system as discussed herein. The payment transaction module 132 may communicate with the user devices 110, 180, and 190, and the wallet application 116 executed on the user devices to provide the functionalities disclosed herein. For example, upon receiving a payment request for an electronic transaction from a payment tool (e.g., the wallet application 116 or a physical payment card issued to the user 140, etc.) the payment transaction module 132 may determine a payment arrangement for the electronic transaction based on various factors using the techniques disclosed herein. The payment transaction module 132 may use the service application 138 to process the electronic transaction for the user. After the payment transaction module 132 is conducted, the payment transaction module 132 of some embodiments may modify the payment arrangement of the electronic transaction. For example, the payment transaction module 132 may change the financial instrument(s) used in the electronic transaction, change an allocation for the different financial instruments used in the electronic transaction, and/or change a delayed payment arrangement for the electronic transaction. In some embodiments, the payment transaction module 132 may also manage rewards for the user account. By managing the rewards of the user account, the payment transaction module 132 may dynamically withhold and release a portion or all of the rewards of the user account under different detected conditions.

Figure 2:
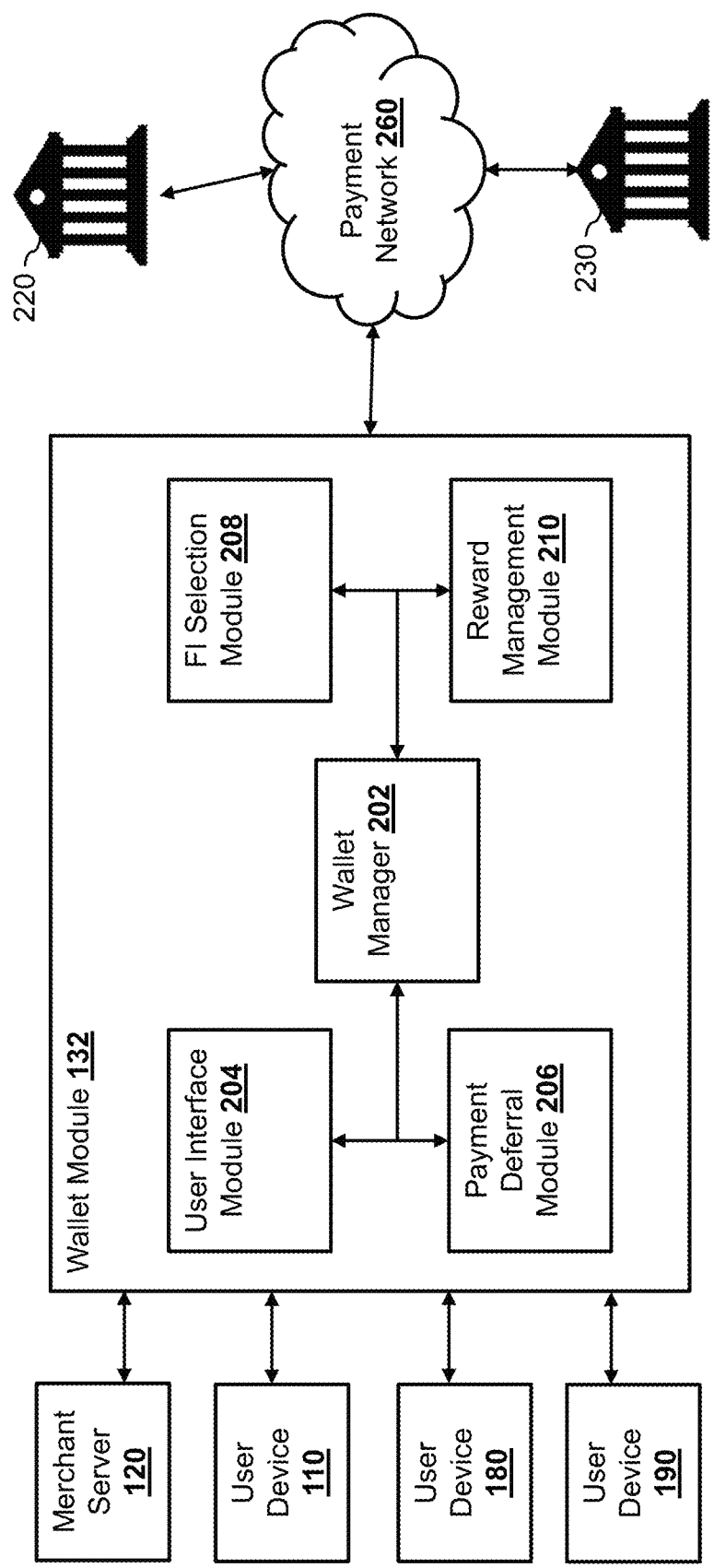
FIG. 2 is a block diagram illustrating a wallet module according to an embodiment of the present disclosure.

FIG. 2 illustrates a block diagram of the payment transaction module 132 according to an embodiment of the disclosure. The payment transaction module 132 includes a wallet manager 202, a user interface module 204, a payment deferral module 206, a financial instrument (FI) selection module 208, and a reward management module 210. In some embodiments, the user interface module 204 may provide a user interface to the user 140 (e.g., via the wallet application 116 and/or the user interface application 112). Using the user interface, the user 140 may register a user account with the service provider server 130. After registering the user account, the user 140 may access data and services associated with the user account via the user interface provided by the user interface module 204.

One or more financial instruments may be linked to the user account. For example, based on information (e.g., data associated with one or more financial instruments such as a card number, an expiration date, a security code, etc.) provided by the user 140 via the user interface, the wallet manager 202 may link one or more financial instruments to the user account. The wallet manager 202 may store the data associated with the one or more financial instruments in a data storage associated with the user account (e.g., in a record associated with the user account within the account database 136, etc.), such that the wallet manager 202 may use the one or more financial instruments to conduct electronic transactions through the user account.

In some embodiments, one or more payment tools may be provided to the user 140. As discussed herein, the payment tools provided to the user 140 may come in various forms. In some embodiments, a physical payment card associated with the user account may be provided to the user 140. The physical payment card may have a magnetic stripe and/or an EMV chip and can be used by the user 140 to conduct payment transactions at a physical merchant store by using the physical payment card to interact with a point-of-sale (POS) device (e.g., a magnetic stripe reader, an EMV chip reader, etc.) of a merchant. In some embodiments, a wallet application (e.g., the wallet application 116) may be provided to a user device (e.g., the user device 110) of the user 140. After downloading and installing the wallet application 116, the user 140 may use the wallet application 116 of the user device 110 to conduct electronic transactions at a physical merchant store through communication between the wallet application 116 and a POS device of a merchant. The user 140 may also use the wallet application 116 of the user device 110 to conduct electronic transactions with a merchant server such as the merchant server 120 (e.g., via an online interface of a merchant) or another device (e.g., another user device such as the user device 180 or the user device 190 that is associated with another user account) through communication between the wallet application 116 of the user device 110 and the other device (e.g., the merchant server via the online interface or another user device through a network such as a short-range wireless network, etc.). In some embodiments, the wallet manager 202 may store the data associated with the one or more financial instruments associated with the user account in the payment tool(s) (e.g., in a memory, such as the magnetic stripe and/or the EMV chip, of the physical payment card, in a memory associated with the wallet application 116 within the user device 110, etc.), such that the user 140 may conduct electronic transactions using the payment tool(s), even when the payment tool(s) or the user device (e.g., the user device 110) has no (or limited) connection to the wallet module 132.

As the user 140 conducts an electronic transaction through the user account (e.g., by using the payment tool provided to the user 140), the wallet module 132 (and specifically, the FI selection module 208 and the payment deferral module 206) may determine a payment arrangement for use in conducting the electronic transaction. The payment arrangement may include a selection of one or more financial instruments that are linked to the user account for use for conducting the electronic transaction. Thus, the FI selection module 208 may determine (or select) one or more of the financial instruments linked to the user account. If multiple financial instruments are used, the FI selection module 208 may also determine an allocation of portions of an amount associated with the electronic transaction to the different financial instruments for the payment arrangement.

In addition to determining the financial instrument(s) used in the electronic transaction, the payment deferral module 206 may determine a deferral arrangement for the electronic transaction. The deferral arrangement may indicate a time period after the electronic transaction is conducted and before the electronic transaction needs to be paid in full (e.g., 5 hours, a day, 21 days, etc.). In some embodiments, the deferral arrangement may include an installment plan (e.g., a schedule of payment portions of the amount at various times).

In some embodiments, the wallet module 132 may automatically determine the payment arrangement for the electronic transaction. For example, upon receiving an indication of conducting the electronic transaction, the wallet application 116 may send a signal to the wallet module 132 via the network 160. The signal may include data identifying the user account of the user 140 and data associated with the payment transaction (e.g., an identity of the payee, an amount, a location associated with the user device 110, an identifier associated with the user account, etc.). The wallet module 132 may then determine the payment arrangement for the electronic transaction based on various factors, such as a payment history of the user account, a balance and/or credit limit of each of the financial instruments linked to the user account, rewards that are offered to the user from each of the financial instruments, a financial goal of the user 140, the location of the user 140, and other factors. As such, the wallet manager 202 may access various data storages to obtain information that may be used by the FI selection module 208 and the payment deferral module 206. For example, the wallet manager 202 may access transaction history data associated with the user account from the account database 136. The wallet manager 202 may also access rewards data, balance data, and/or limit data from different servers associated with the different financial institutions. The FI selection module 208 and the payment deferral module 206 may then determine the payment arrangement for the electronic transaction using the data obtained by the wallet manager 202.

In some embodiments, the user interface module 204 may provide an interface on the payment tool used by the user 140 that enables the user 140 to provide input(s) for the payment arrangement. For example, if the user 140 uses the wallet application 116 to initiate or conduct a payment for the electronic transaction, upon receiving a request for conducting a payment (e.g., the user 140 transmitting a payment transaction request to the wallet module 132 via the user interface of the wallet application 116), the wallet application 116 may retrieve the data associated with the financial instruments that are linked to the user account (stored in the memory of the user device 110) and may present a list of the financial instruments on a user interface of the wallet application 116. The wallet application 116 may then receive a selection of one or more of the financial instruments from the user 140 via the user interface. On the other hand, if the user 140 uses the physical payment card to initiate the payment, upon receiving a request for conducting a payment transaction (e.g., the user 140 pressing a button on the physical payment card, etc.), the physical payment card may retrieve data associated with the financial instruments that are linked to the user account (stored in the memory of the physical payment card) and may present a list of the financial instruments on a user interface of the physical payment card (e.g., a touch-sensitive display on the physical payment card, etc.). The physical payment card may then receive a selection of one or more of the financial instruments from the user 140 via the user interface. In the same manner, the payment tool may also enable the user 140 to select a period of time if they user selects a delayed payment arrangement (e.g., instance pay, delayed for 3 days, for 21 days, an installment plan, etc.).

In some embodiments, as discussed herein, the user 140 and/or the wallet module 132 may not need to determine a payment arrangement for the transaction when the transaction is processed. For example, the payment tool may transmit a token associated with the user account of the user 140 with the service provider server 130 to the merchant server 120 for processing the electronic transaction. The token may include data that identifies the service provider server 130, such that when it is transmitted to the payment network 260 (e.g., by the merchant server 120), the token is routed to the service provider server 130. Upon receiving the token, the wallet module 132 may create a receivable transaction record in the account database 136, in association with the user account of the user 140 (and/or the wallet application 116 of the user 140) for the electronic transaction. The receivable transaction record may indicate that the entire amount of the electronic transaction is allocated to the user account of the user 140 (and/or the wallet application 116). The wallet module 132 may transmit a transaction complete message to the merchant 120 via the payment network 260 even though none of the financial instruments associated with the user account of the user 140 has been charged. Instead, the electronic transaction is funded initially by the service provider server 130 and allocated entirely to the user account of the user 140 (and/or the wallet application 116). The user 140 and/or the wallet module 132 may then determine a payment arrangement for the electronic transaction after the electronic transaction is processed, using techniques discussed herein.

After the payment arrangement is determined, the wallet module 132 may process (e.g., by using the service application 138) the one or more re-payment transactions for using the financial instruments included in the payment arrangement to pay back to service provider server 130. A re-payment transaction is a transaction where a financial instrument of the user 140 is charged with a portion of the amount (or the entire amount) of the electronic transaction, payable to the service provider of the service provider server 130. The wallet module 132 may process the re-payment transactions by communicating with (e.g., transmitting one or more commands to) one or more bank institutions (e.g., an acquiring bank 220, an issuing bank 230) associated with the electronic transaction via a payment network 260. In some embodiments, the payment network 260 is a closed network that connects only the financial institutions involved in a payment process (e.g., various acquirer banks (e.g., the acquiring bank 220), issuing banks (e.g., the issuing bank 230), and institutions that facilitate the payment process, such as the service provider server 130 and the merchant server, etc.). The acquiring bank 220 is the financial institution that maintains a bank account of the merchant associated with the merchant server 120 or the service provider associated with the service provider server 130. The issuing bank 230 is the financial institution that issues the financial instrument (e.g., a credit card, a debit card, etc.) to the user 140. In some embodiments, the service provider server 130 may act as an acquiring bank and/or an issuing bank for a payment transaction.

The payment network is accessible only by these institutions involved in the payment process, and not by the general public. Furthermore, communications transmitted within the payment network is provided with enhanced security such as encryption and digital signature, which enables sensitive data such as financial data to be transmitted securely. Data that is transmitted within the payment network is generally more secured than data that is exposed to a public network such as the Internet.

Thus, the wallet module 132 may communicate with the financial institutions within the payment network 260 based on the financial instruments included in the payment arrangement, to process the re-payment transactions. The communication to an issuing bank (e.g., the issuing bank 230) may indicate a payment of an amount allocated for a corresponding financial instrument and also data associated with the electronic transaction included in the receivable transaction record, such as an MCC code, a purchase category, a merchant identifier, etc. associated with the electronic transaction. The data associated with the electronic transaction is included in the communication with the financial institutions associated with the financial instruments such that the financial institutions can provide rewards to the user account of the user 140 based on the electronic transaction (instead of the re-payment transactions). The wallet module 132 may receive confirmations from the acquiring banks and the issuing banks, indicating that the transfer of funds to the service provider of the service provider server 130 is completed. Once the re-payment transactions are completed, the wallet module 132 may update the receivable transaction record in the account database 136, indicating that the entire amount of the electronic transaction has been re-allocated to the user account of the user 140 (and/or the wallet application 116). In some embodiments, the wallet module 132 may remove the receivable transaction record from the account database 136.

In some embodiments, rewards may be offered to the user account based on the processing of the electronic transaction. In some embodiments, the reward management module 210 may manage the rewards provided to the user account (e.g., from a financial institution associated with the payment instrument(s) used in the electronic transaction, the merchant associated with the electronic transaction, etc.), such that the user may use the rewards in subsequent electronic transactions.

Figure 3:
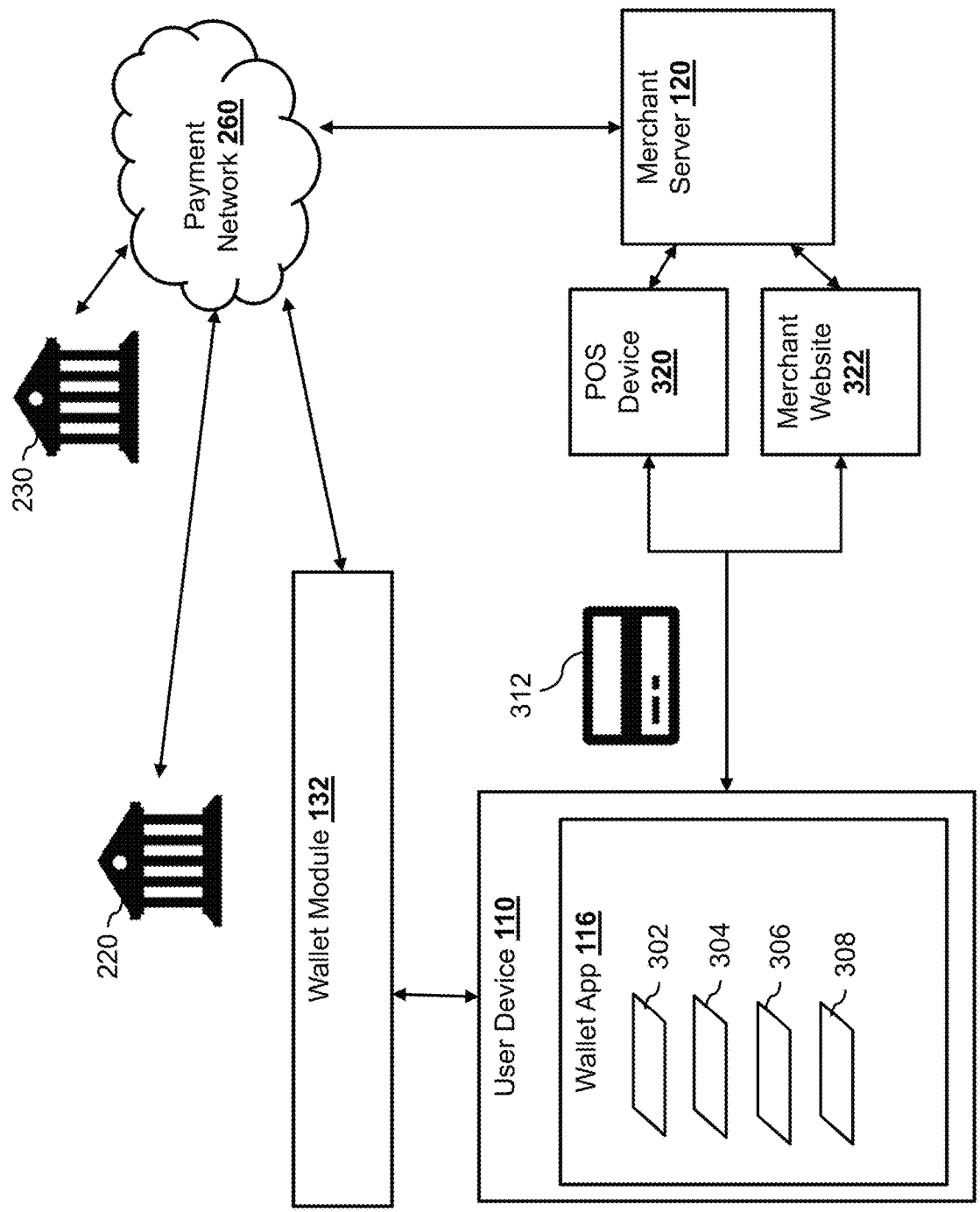
FIG. 3 illustrates an exemplary data flow of conducting and managing electronic transactions according to an embodiment of the present disclosure.

FIG. 3 illustrates an exemplary data flow for conducting an electronic transaction according to one embodiment of the disclosure. In this example, the user 140 may conduct an electronic transaction associated with a purchase of a good or service from the merchant associated with the merchant server 120. The user 140 may be located at a physical store of the merchant. The user 140 may use a payment card 312 issued to the user 140 by the service provider server 130 and/or the wallet application 116 to conduct the electronic transaction. In some embodiments, the payment card 312 and/or the wallet application 116 may retrieve a list of financial instruments (e.g., financial instruments 302-308) that are linked to the user account, and may present options for determining a payment arrangement for the electronic transaction (e.g., options to select one or more of the financial instruments linked to the user account, an allocation of the amount associated with the electronic transaction to each of the financial instruments, a deferral arrangement, etc.). The different financial instruments 302-308 may represent different funding sources that the user 140 may use to pay in an electronic transaction. The financial instruments 302-308 may include one or more bank accounts, one or more credit cards, one or more debit cards, one or more gift cards, one or more rewards cards, etc.

In some embodiments, the payment card 312 may include a touch-sensitive display that enables the user to select various aspects of a payment arrangement. In some embodiments, the payment card 312 may be communicatively coupled (e.g., via a short-range wireless communication protocol) with the wallet application 116 of the user device 110 and may use the wallet application 116 to obtain selection of various options associated with the payment arrangement. For example, the user 140 may select the financial instruments 302 and 304 for use in conducting the electronic transaction, where the amount associated with the electronic transaction is split evenly between the financial instruments 302 and 304. The user 140 may also select to have no deferred payment arrangement. In some embodiments, under an offline operation mode (when the payment card 312 and the wallet application 116 has no or limited connection with the wallet module 132), the payment card 312 and/or the wallet application 116 may transmit data associated with the selected financial instrument(s) to the point-of-sale (POS) device 320 of the merchant. The merchant server 120 may then communicate with various financial institutions (e.g., the acquiring bank 220, the issuing bank 230, etc.) within the payment network 260 to process the electronic transaction.

In some embodiments, under a first operation mode (when the payment card 312 and the wallet application 116 has connection with the wallet module 132), instead of transmitting the data associated with the financial instrument(s), the payment card 312 and/or the wallet application 116 may transmit a token to the POS device 320, as discussed herein. The payment card 312 and/or the wallet application 116 may also transmit information associated with the electronic transaction (e.g., the identity of the merchant, the amount, the payment arrangement determined by the user 140, etc.) to the wallet module 132 via the network 160. Upon receiving the information associated with the payment transaction, the wallet module 132 may use the FI selection module 208 and the payment deferral module 206 to determine the payment arrangement for the electronic transaction if a payment arrangement has not been determined already.

In some embodiments, the user 140 may use the wallet application 116 to conduct an electronic transaction with a merchant website 322 of the merchant. For example, when the user 140 uses the user device 110 to browse the merchant website 322, the user 140 may use the wallet application 116 to initiate or conduct a payment transaction for paying for a purchase with the merchant website 322 based on communication between the wallet application 116 and the merchant website 322.

In some embodiments, each of the FI selection module 208 and the payment deferral module 206 may use a machine learning model to determine the corresponding portions of the payment arrangement. For example, the FI selection module 208 may use a machine learning model that is configured to output a selection of one or more financial instruments from the financial instruments linked to the user account. The input parameters for the machine learning model may include an identity of the payee, an amount, a category of the purchase, rewards information associated with each of the financial instruments linked to the user account, etc.

The payment deferral module 206 may use another machine learning model that is configured to output a deferral time (e.g., 5 hours, 1 day, 21 days, etc.) for paying the electronic transaction. The input parameters for the machine learning model may include an amount associated with the electronic transaction, expected expenses and income within a period of time (e.g., within a week, within a month, etc.).

Thus, the FI selection module 208 and the payment deferral module 206 may work together to determine a payment arrangement for the electronic transaction and may process the electronic transaction according to the payment arrangement. In some embodiments, the wallet module 132 may not determine a payment arrangement for the electronic transaction at the time of processing the electronic transaction. Instead, the wallet module 132 may transmit a transaction complete message to the merchant server 120 to indicate that the transaction is completed and providing the funds to the merchant server 120 without first charging any financial instruments associated with the user account of the user 140. The wallet module 132 may determine the payment arrangement (or may enable the user 140 to determine the payment arrangement via a user interface of the payment tool) after the electronic transaction is processed (e.g., 5 hours after, 12 days after, etc.).

After the payment arrangement is determined, the wallet module 132 may process one or more re-payment transactions to charge the financial instruments included in the payment arrangement for paying back the service provider. The wallet module 132 may process the re-payment transactions by communicating with the various financial institutions via the payment network 260. For example, the wallet module 132 may communicate with the acquiring bank associated with the merchant and the issuing banks associated with the financial instruments 302 and 304 within the payment network 260 to complete the electronic transaction and/or the re-payment transactions (e.g., transmitting instructions to the issuing banks for sending funds from corresponding accounts of the user 140 with the issuing banks associated with the financial instruments 302 and 304 to merchant account with the acquiring bank).

In some embodiments, after completing the electronic transaction and/or the re-payment transactions, the wallet module 132 may subsequently modify the payment arrangement used for the electronic transaction without canceling the electronic transaction and processing a new electronic transaction. Specifically, the wallet module 132 may dynamically manage and modify the electronic transactions after the electronic transactions have been conducted. The modification of the electronic arrangement may include selecting one or more different financial instruments (or selecting different allocations for the financial instruments) for use in the electronic transaction. The modification may also include an adjustment to the payment deferral arrangement. Using the example discussed above where the payment arrangement includes the use of financial instruments 302 and 304 were selected for use in conducting the electronic transaction for the user 140, the user 140 and/or the wallet module 132 may determine a different set of financial instruments for use for the electronic transaction. For example, the user 140 and/or the wallet module 132 may select the financial instruments 306 and 308, split 60%/40% of the amount of the electronic transaction between the financial instruments 306 and 308. The user 140 and/or the wallet module 132 may also determine to adjust the payment deferral arrangement to (21 days deferral).

In some embodiments, the modification to the payment arrangement may be caused by (or triggered by) different factors such as information and/or analysis obtained after the electronic transaction is completed. For example, the user 140 may conduct the payment transaction at a location (e.g., a merchant store) where the user device 110 has no or limited connectivity with the wallet module 132. Thus, the user 140 may not rely on the wallet module 132 to determine a payment arrangement for the payment transaction. After conducting the payment transaction (e.g., after the user 140 has left the merchant store), the user device 110 may regain connectivity with the wallet module 132. The wallet application 116 may be configured to automatically transmit information associated with the payment transaction that was conducted when the connectivity with the wallet module 132 was limited. Thus, upon receiving the indication of the recent payment transaction, the wallet module 132 may determine a payment arrangement for the payment transaction (e.g., selecting the financial instruments 306 and 308 that will split the amount of the payment transaction in a 60/40 ratio and a payment deferral of 21 days) based on information accessible by the wallet module 132 such as the payment history of the user, rewards information associated with various financial instruments, etc. In some embodiments, after conducting the payment transaction, the wallet module 132 may monitor changes to rewards associated with the financial instruments linked to the user account. If the wallet module 132 detects changes to the rewards offered by the financial instruments, the wallet module 132 may determine a financial instrument for the payment transaction. For example, the wallet manager 202 may use the FI selection module 208 and the payment deferral module 206 for determining the payment arrangement for the payment transaction.

Alternatively, the user 140 may determine a different payment arrangement for the payment transaction after conducting the electronic transaction. For example, after conducting the electronic transaction, the user 140 may realize that the financial instruments were selected for the electronic transaction by mistake and would like to correct the mistake. Thus, the wallet application 116 may provide a user interface that enables the user 140 to change the payment arrangement after the electronic transaction is conducted.

Furthermore, as discussed herein, in order to improve the efficiency of processing electronic transactions (especially when the volume of payment transactions is large and the processing of the payment transactions is required to be performed in real time), the wallet module 132 and/or the wallet application 116 may determine a default payment arrangement (e.g., a predetermined financial instrument and having a maximum time period for deferring payment) for processing the electronic transaction, such that the electronic transaction can be processed in real time without unnecessary delay. The wallet module 132 may then determine an optimal payment arrangement for the electronic transaction after the electronic transaction is processed.

After determining a new payment arrangement, the wallet module 132 may modify the payment arrangement for the electronic transaction (e.g., using the financial instruments 306 and 308 instead of the financial instruments 302 and 304, having a 21 days deferral instead of no payment deferral, etc.). In some embodiments, the wallet module 132 may modify the payment arrangement used for the electronic transaction without canceling the electronic transaction and re-processing the electronic transaction using the newly determined payment arrangement. Instead, the wallet module 132 may communicate to the acquiring bank and the issuing banks associated with the financial instruments in the old payment arrangements (e.g., the financial instruments used when the electronic transaction was conducted) and the financial instruments in the new payment arrangement via the payment network 260 to process the modification of the payment arrangement for the electronic transaction. For example, the wallet module 132 may communicate with various financial institutions within the payment network 260 to charge the financial instruments specified in the modified payment arrangement and to cancel the charges applied to the financial instruments specified in the original payment arrangement.

This way, the changes to the payment arrangement may occur without notifying the merchant since the electronic transaction is never canceled. As such, using the techniques disclosed herein to process the change to the financial instrument of the payment transaction may cause minimal impact to the electronic transaction (e.g., the merchant would not interrupt the delivery process of the item being purchased due to changes to the electronic transaction, etc.).

Figure 4A:
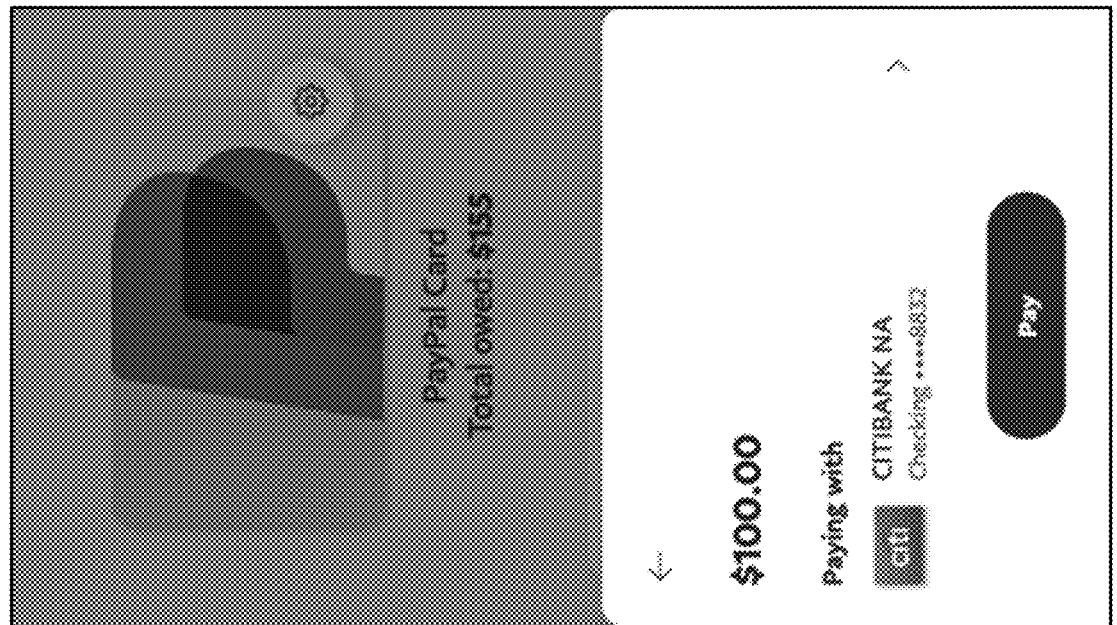
FIG. 4A illustrates an exemplary sequence of user interfaces for determining a payment arrangement of an electronic transaction according to an embodiment of the present disclosure.
Figure 4A:
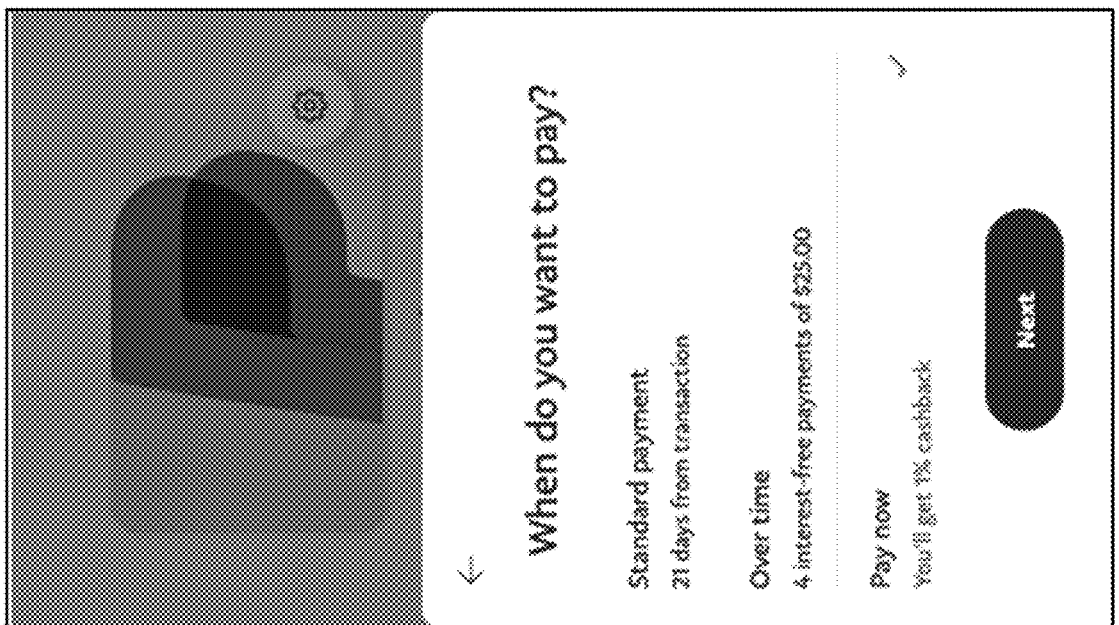

FIG. 4A illustrates an example sequence of user interfaces 402 and 404 of the wallet application 116 for determining a payment arrangement for an electronic transaction. In some embodiments, the sequence of user interfaces 402 and 404 is executed on the user device 110 after receiving a request for performing an electronic transaction. The user 140 submits, to the wallet application 116, a request for performing an electronic transaction. For example, the sequence of user interface 402 and 404 may be executed when the wallet application 116 receives an indication from the user 140 for performing the electronic transaction via a user interface of the wallet application 116 and/or when a connection is established with the POS device 320 or the merchant website 322. The user interface 402 prompts the user 140 for a payment deferral period. Via the user interface 402, the user 140 may provide inputs indicating a payment deferral arrangement. For example, the user 140 may select to pay immediately, or at a later time (e.g., within 5 hours, 1 day, 21 days, through an installment plan, etc.). After determining the payment deferral arrangement, the wallet application 116 may move from presenting the user interface 402 to presenting the user interface 404, in which the user 140 may select one or more financial instruments for conducting the electronic transaction.

The user interface 404 may present a list of financial instruments that are linked to the user account. In this example, the list of financial instruments linked to the user account may include a bank account with Citibank™. After receiving a selection of one or more financial instruments and allocation of the amount associated with the user account among the one or more financial instruments, the wallet application 116 may determine a payment arrangement for the electronic transaction based on the inputs obtained from the user 140 via the sequence of user interfaces 402 and 404. The wallet application 116 may then conduct the electronic transaction using the determined payment arrangement (e.g., transmitting the data of the financial instruments to the POS device 320 or the merchant website 322).

Figure 4B:
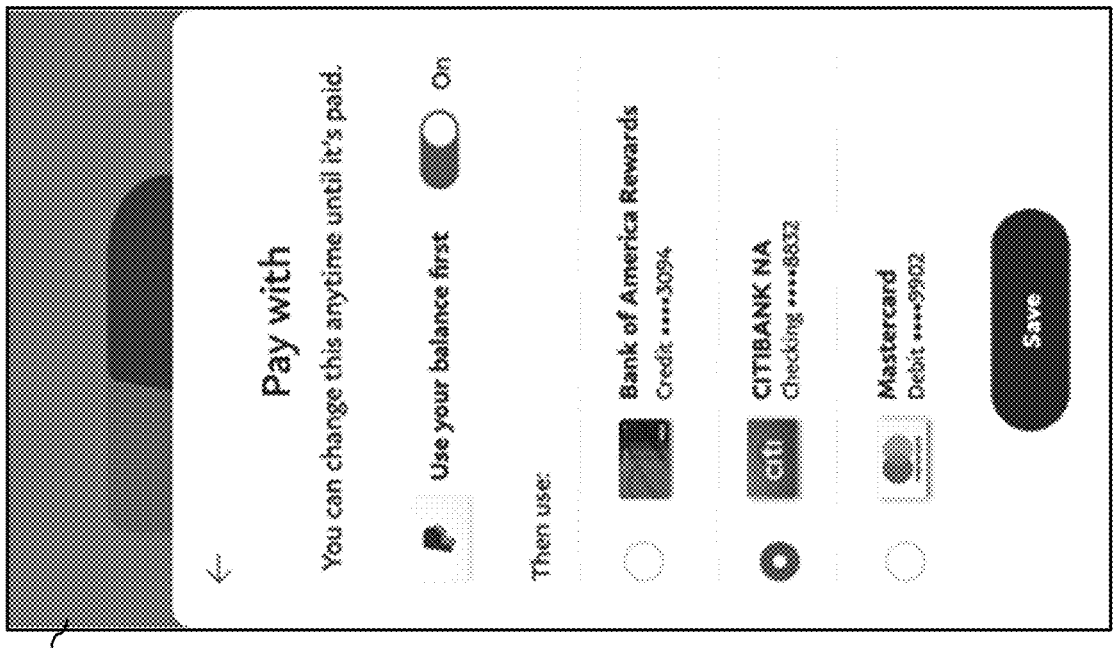
FIG. 4B illustrates another exemplary sequence of user interfaces for determining a payment arrangement of an electronic transaction according to an embodiment of the present disclosure.
Figure 4B:
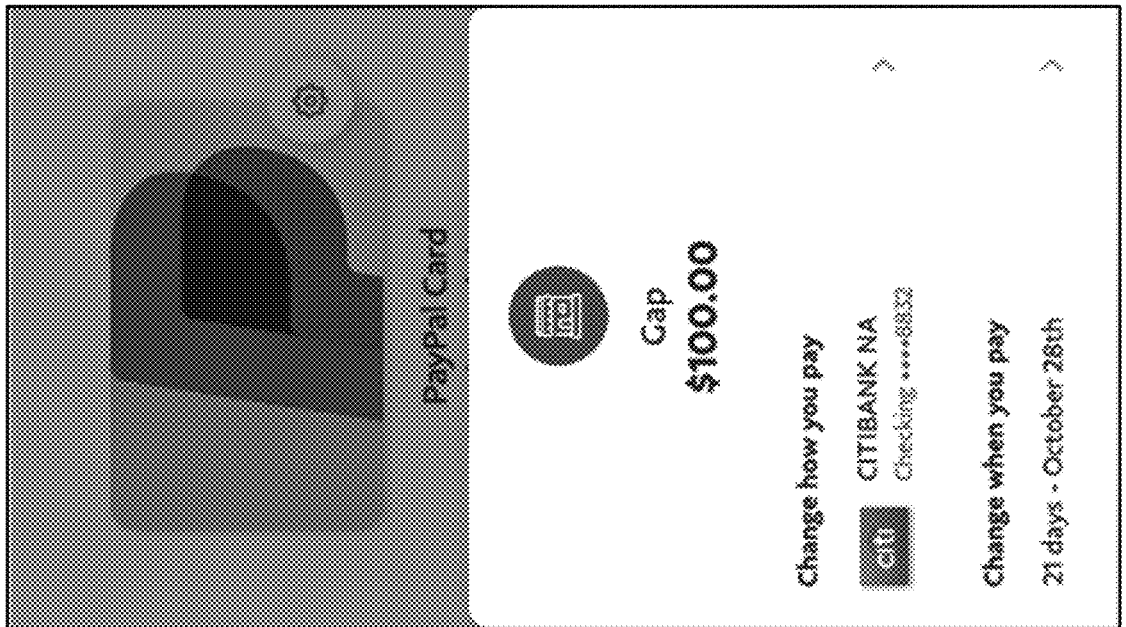
Figure 4C:
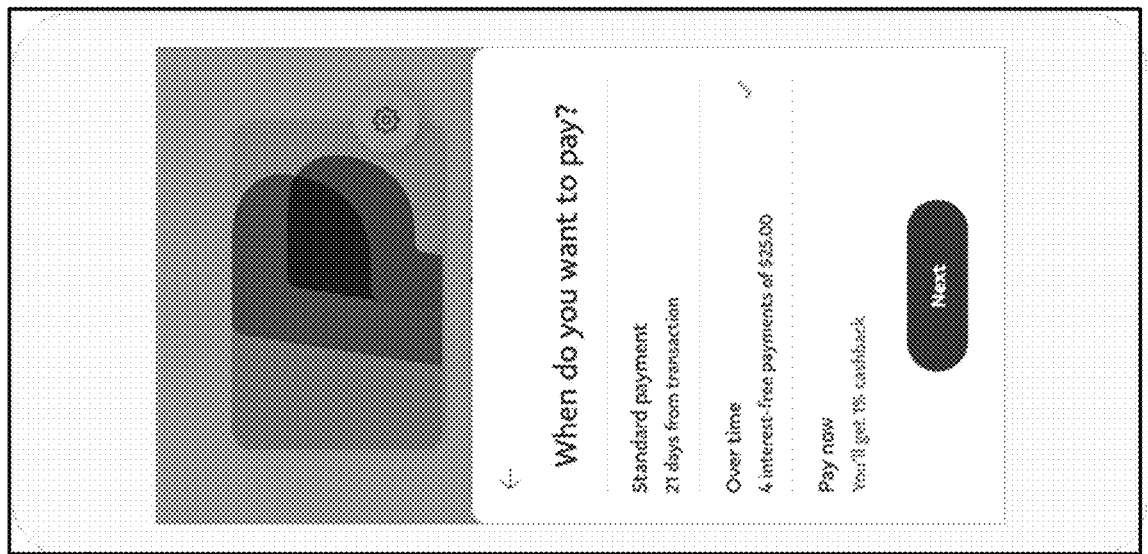
FIG. 4C illustrates an exemplary sequence of user interfaces for modifying the payment arrangement of an electronic transaction after the electronic transaction has been conducted according to an embodiment of the present disclosure.
Figure 4C:
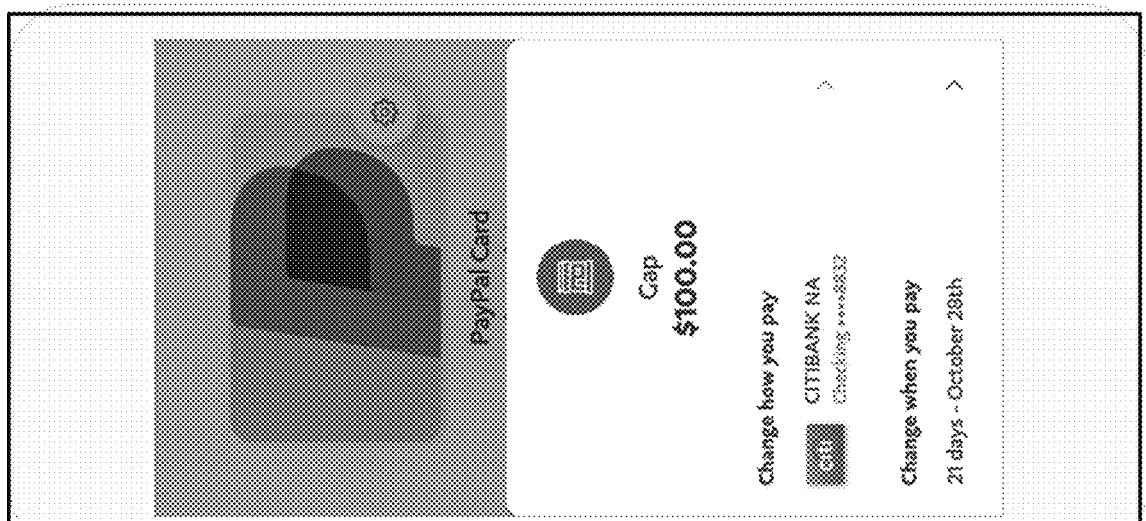

FIGS. 4B and 4C illustrate another sequence of user interfaces 406, 408, and 410 for modifying the payment arrangement for the electronic transaction previously conducted. For example, the wallet application 116 may enable the user 140 to search/browse any electronic transaction that includes a payment and that has been previously conducted through the user account. As long as the user 140 has not fully paid for the electronic transaction, the wallet application 116 may enable the user 140 to modify the payment arrangement for the electronic transaction. Upon receiving a selection of a payment transaction, the wallet application 116 may present the user interface 406, as shown in FIG. 4B. In this example, the user interface 406 presents information associated with the payment arrangement that was used for conducting the electronic transaction. Specifically, the user interface 406 indicates that the checking account having account number that ends with '8832' was used to pay for the electronic transaction, and a 21 day payment deferral arrangement was used for the electronic transaction. The user 140 may select to change the financial instrument used for the electronic transaction and/or the payment deferral arrangement. In this example, after receiving a selection for changing the financial instrument used for the electronic transaction, the wallet application 116 may move from presenting the user interface 406 to presenting the user interface 408 for modifying the financial instrument(s) used to conduct the electronic transaction. For example, the user 140 may select, via the user interface 408, any combination of the financial instruments, including an account balance of the user account with the service provider server 130, a Bank of America Rewards™ credit card, the Citibank™ credit card, and a Mastercard™ debit card for the electronic transaction. Upon receiving a selection of the one or more financial instrument, the wallet application 116 may present the current selection in the user interface 406 and prompt the user to confirm the selection.

In some embodiments, after receiving a selection for changing the payment deferral arrangement on the user interface 406, the wallet application 116 may move from presenting the user interface 406 to presenting the user interface 410 for modifying the payment deferral arrangement used to conduct the electronic transaction, as shown in FIG. 4C. The user interface 410 presents the payment deferral arrangement that was determined initially for the electronic transaction when the electronic transaction was conducted. Via the user interface 410, the user may adjust the payment deferral time period (e.g., from 21 days to 4 days, etc.) and/or adjust an installment plan (e.g., from 4 installments to 1 installment, etc.).

In some embodiments, multiple previously conducted electronic transactions may be modified as a group. For example, multiple electronic transactions may be selected to form a payment group such that payment towards the selected electronic transactions may be performed together. The wallet module 132 may also modify the payment arrangement for the selected electronic transactions as a group, such as changing the financial instrument(s) used for the selected electronic transactions and/or adjusting a payment deferral arrangement for the selected electronic transactions as a group.

Figure 5:
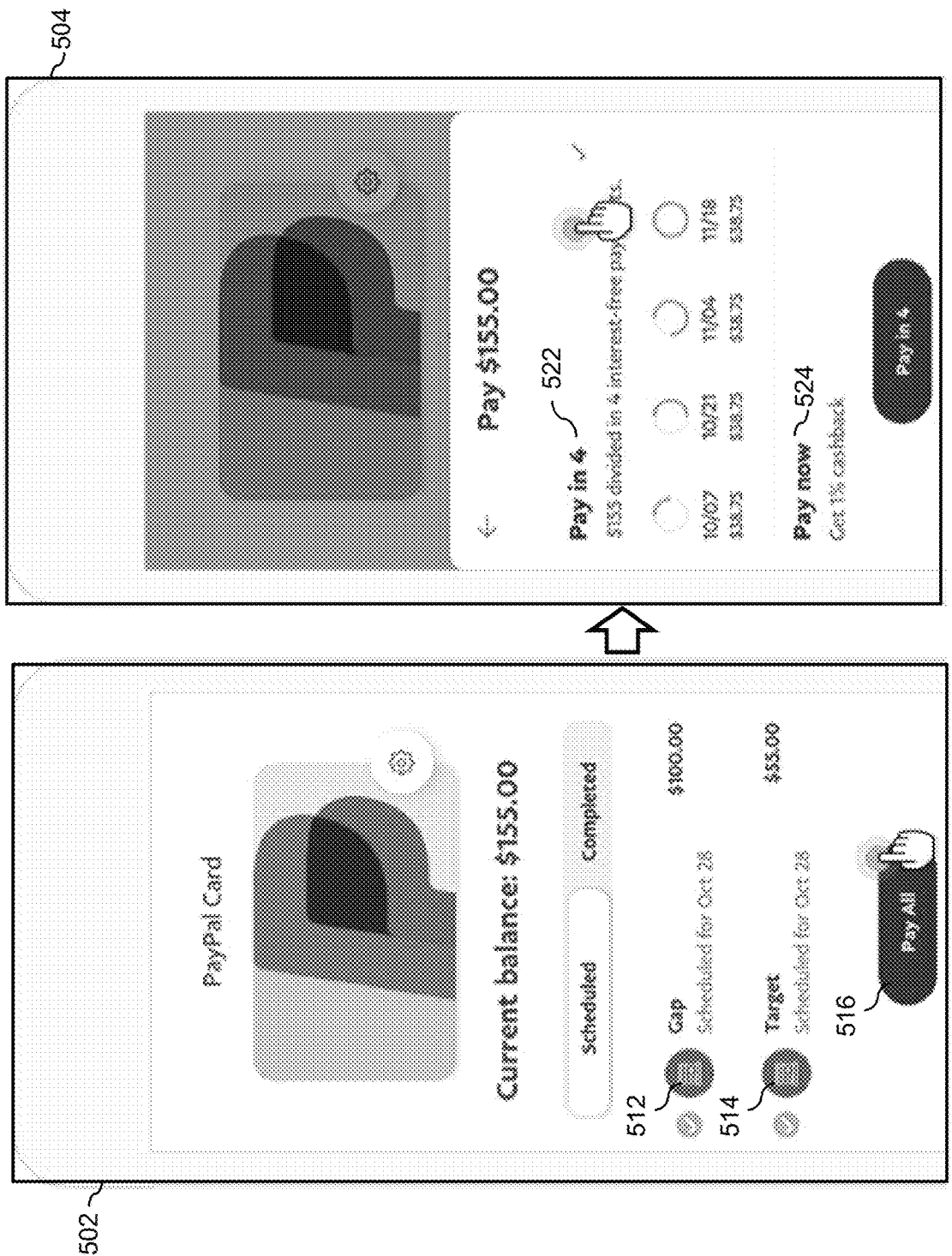
FIG. 5 illustrates an exemplary sequence of user interfaces for managing the payment arrangement for a group of electronic transactions according to an embodiment of the present disclosure.

FIG. 5 illustrates a sequence of user interfaces 502 and 504 of the wallet application 116 for grouping multiple electronic transactions and modifying the payment arrangement of the electronic transactions as a group. The wallet application 116 may present the user interface 502 in response to an indication that the user 140 wants to pay multiple electronic transactions as a group. As shown, the user interface 502 presents a list of recently conducted electronic transactions. The list of recently conducted electronic transactions may include electronic transactions that have been conducted but have not yet paid off by the user 140, such that the wallet module 132 may still modify the payment arrangement(s) of the electronic transactions. Via the user interface 502, the user 140 may select two or more electronic transactions to be part of a payment group. In this example, the user 140 has selected an electronic transaction 512 associated with a purchase from Gap™ in the amount of $100 and an electronic transaction 514 associated with a purchase from Target™ in the amount of $55, as indicated by the check marks next to the two electronic transactions 512 and 514. Upon receiving a selection of the "pay all" selectable element 516, the wallet manager 202 may group the electronic transactions 512 and 514 as a payment group and may cause the wallet application 116 to move from presenting the user interface 502 to presenting the user interface 504.

The user interface 504 may present options for modifying the payment arrangement for the group of electronic transactions 512 and 514 as a group. As shown in this example, the user interface 504 presents a first option of paying the group of electronic transactions 512 and 514 in four installments on October 7, October 21, November 4, and November 18. Since the four installments are for the payments of the electronic transactions 512 and 514 as a group, the total amount of the electronic transactions 512 and 514 ($155) is divided up into four payments of $38.75. The user interface 504 also presents a second option of "pay now" where the entirety of $155 (the total amounts from the electronic transactions $100 and $55) is paid at once. In some embodiments, the user interface 504 may also enable the user 140 to select different financial instrument(s) (and/or different allocation of portions of the entire amount) used for paying the group of electronic transactions 512 and 514.

Upon determining the new payment arrangement, the wallet manager 202 may process the changes to the electronic transactions 512 and 514 by communicating with the financial institutions (e.g., the acquiring banks and issuing banks) within the payment network 260 without cancelling the electronic transactions 512 and 514. Thus, the electronic transactions 512 and 514 are modified without requiring the merchant to perform any actions with respect to the electronic transactions 512 and 514.

The feature of grouping different electronic transactions that have been previously conducted improves how cash flow can be managed by the user 140 while maintaining data security since the modifications are performed via secured communications within the payment network 260.

In another aspect of the disclosure, the wallet module 132 may manage rewards for user accounts of the service provider server 130. In some embodiments, the service provider of the service provider server 130 may offer incentives (e.g., in the form of rewards such as cashback or other types of rewards, etc.) to users for using the functions of the wallet application 116 and wallet module 132 to conduct electronic transactions. For example, the service provider server 130 may offer rewards (e.g., cashback rewards when the user 140 chooses to pay for the electronic transaction or the group of electronic transactions in full immediately), as shown in the option 524 in FIG. 5. Thus, one benefit for the user 140 in using the functionalities of the wallet application 116 and/or the wallet module 132 in conducting electronic transactions is the ability to obtain rewards from multiple parties, such as the merchant associated with the merchant server 120, the financial instrument(s) used in conducting the electronic transaction(s), and the service provider.

When the user account of the user 140 obtains rewards as a result of conducting electronic transactions, the wallet module 132 may store information associated with the rewards (e.g., source of the rewards, an amount, how to redeem, etc.) in records within the account database 136 in association with the user account. The rewards may then be used in subsequent electronic transactions through the user account. For example, when the user 140 initiates an electronic transaction through the physical payment card 312, the wallet application 116, and/or the wallet module 132, the wallet module 132 may determine whether the user account is associated with any rewards that can be used in the present electronic transaction, and may cause the user interface of the payment card 312 and/or the wallet application 116 to present the rewards as financial instrument option(s) for the electronic transaction. Based on the user 140's selection of one or more of the rewards as financial instruments for conducting the electronic transaction, the wallet module 132 may process the electronic transaction using the selected one or more of the rewards.

In some embodiments, the wallet module 132 and/or the wallet application 116 may provide a bill splitting service for the users. When the user 140 initiates an electronic transaction via the user interface of the wallet application 116, the wallet application 116 may provide, via the user interface, a bill splitting option for the electronic transaction. The selection of the bill splitting option may enable the user 140 to share the payment of the electronic transaction with one or more other users. For example, the user 140 may be having a meal at a restaurant with friends and desire to split the bill among the friends. In some embodiments, in response to receiving a selection of the bill splitting option, the wallet application 116 may present a list of users associated with the user 140. The list of users may include contacts stored on the user device 110. In some embodiments, the list of users may include users that are detected to be within a distance threshold of the user 140. For example, the wallet application 116 may use a short-range wireless communication protocol (e.g., Bluetooth®) to detect any devices within the distance threshold of the user device 110. The wallet application 116 may then determine whether the detected devices are associated with user accounts of the service provider server 130 and may present information associated with the user accounts on the user interface of the wallet application 116. Thus, the user 140 may select one or more other users through the user interface of the wallet application 116 for sharing the payment of the electronic transaction.

In some embodiments, to facilitate the bill splitting service, the wallet module 132 may determine one of the users sharing the payment (e.g., the user 140) as a primary user. The wallet module 132 may use the user account of the primary user to perform the electronic transaction, and initiate additional transactions to transfer funds (e.g., in a predetermined contribution amount of the corresponding user) from user accounts of the other users to the user account of the primary user. This way, the merchant receives a single payment from the electronic transaction even though the bill (the payment) is being shared among multiple parties. The wallet module 132 may link the electronic transaction for the merchant to the one or more fund transfer transaction such that information associated with the bill splitting is stored in association with the electronic transaction.

As discussed herein, rewards may be offered based on conducting the electronic transaction. The rewards may be offered by the service provider of the service provider server 130, the merchant, and/or the financial instrument(s) used to conduct the electronic transaction. Since the electronic transaction with the merchant was conducted through the user account of the primary user (e.g., the user 140), the rewards are credited to the user account of the primary user. However, the primary user may desire to share the rewards among the users who contributed to the payment of the electronic transaction.

Thus, in some embodiments, the wallet module 132 may provide a rewards splitting service for the user. In some embodiments, when a user account receives rewards, the reward management module 210 may store information associated with the rewards (e.g., the electronic transaction that is linked to the rewards, an entity that offered the rewards such as a merchant, a financial instrument, an amount, how to redeem the rewards, etc.). In addition, the reward management module 210 may determine whether the rewards should be split among multiple user accounts. For example, the reward management module 210 may determine whether one or more fund transfer transactions are associated with (e.g., link to) the electronic transaction that is linked to the reward. If one or more fund transactions are linked to the electronic transaction, the reward management module 210 may determine the user accounts involved in the one or more fund transactions and may distribute portions of the rewards among the user accounts involved in the one or more fund transactions.

In some embodiments, the reward management module 210 may determine a distribution plan for distributing the rewards among the user accounts. For example, the reward management module 210 may divide the rewards evenly among the user accounts (e.g., a $10 reward may be divided into four $2.50 reward for four user accounts). In another example, the reward management module 210 may divide the rewards in proportion to the amount of contribution associated each user account toward the electronic transaction. After determining the distribution plan, the reward management module 210 may transfer portions of the rewards to the different user accounts according to the distribution plan.

While some rewards (e.g., cashback rewards, points, etc.) can be easily divided and distributed among multiple user accounts, other rewards (e.g., an incentive associated with a future purchase such as a coupon for a free item and/or a discount in the next purchase) cannot be easily divided and/or distributed to multiple user accounts. In such instances, since the rewards cannot be distributed, the reward management module 210 may manage the use of the rewards by initially withholding the rewards in the user account from use by the user 140. For example, the reward management module 210 may tag the rewards (e.g., adding a tag to the record in the account database 136 that is associated with the rewards) in the user account such that the reward management module 210 may prevent the user 140 from using the rewards in electronic transactions in the future.

In some embodiments, the reward management module 210 may determine a set of conditions for releasing the rewards for use. For example, in some embodiments, the reward management module 210 may release the rewards for use in electronic transactions when the user device 110 of the user 140 is within a distance threshold from and the user device(s) associated with the user account(s) that contributed to the previous electronic transaction linked to the rewards. Thus, the rewards that were obtained from a previous dinner gathering may be released and used in a subsequent gathering that involves the same parties. In some embodiments, the reward management module 210 may release the tagged rewards for use in electronic transactions in response to receiving authorization from the other user(s) who contributed to the previous electronic transaction. For example, the wallet application 116 and/or the payment card 312 may enable the user 140 to select the tagged rewards for use in an electronic transaction. Upon receiving a selection of the tagged rewards, the wallet module 132 may send one or more authorization requests to user devices of the other user(s) involved in the previous electronic transaction. The other user(s) may authorize or reject the request through the interface presented on the user device(s). If authorization from all of the users are received, the reward management module 210 may authorize the use of the tagged rewards. On the other hand, if authorization from at least one of the other users is not received, the reward management module 210 may disallow the user 140 from using the tagged rewards and may force the user 140 to select another financial instrument for the current electronic transaction.

Figure 6:
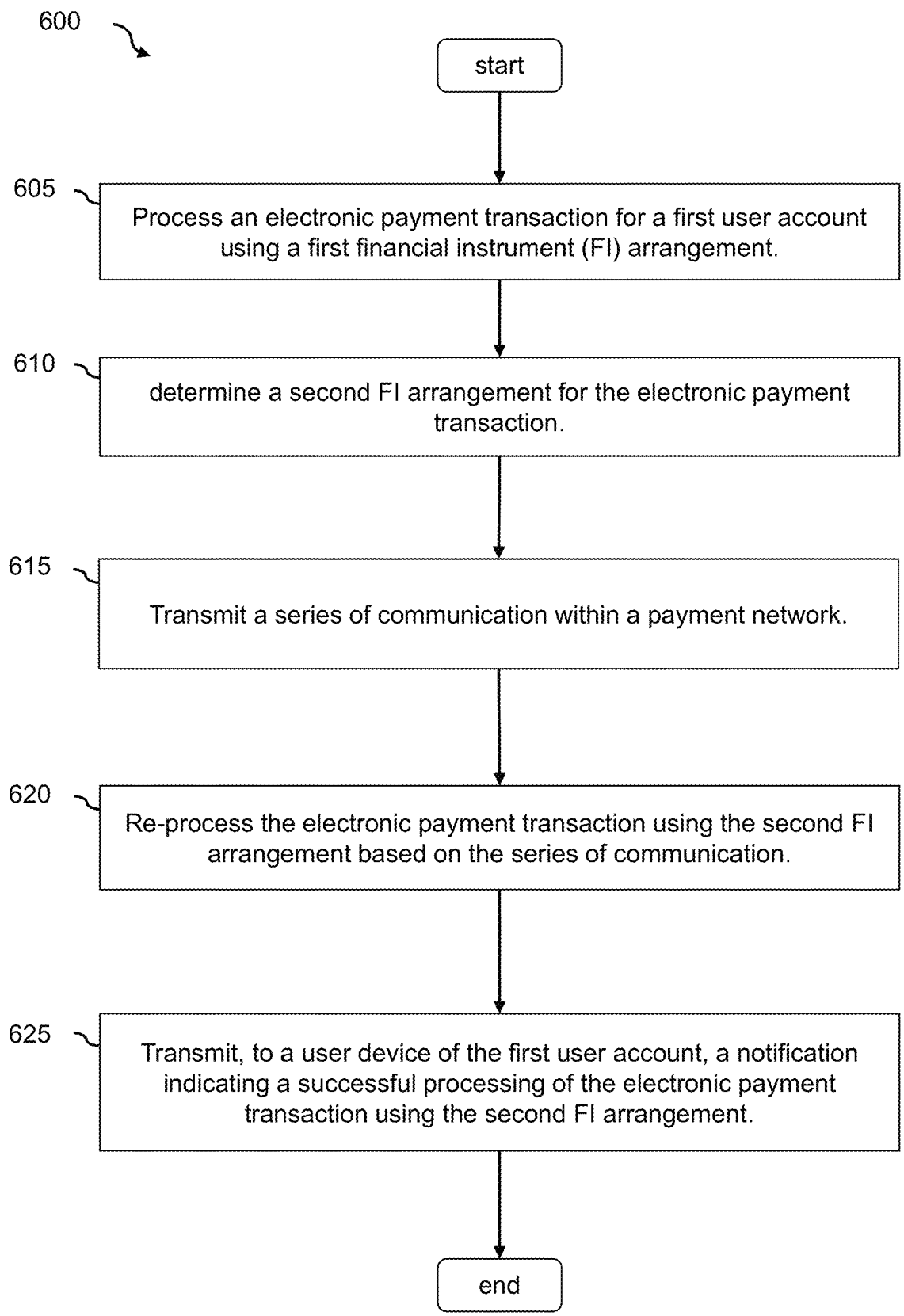
FIG. 6 is a flowchart showing a process of modifying a payment arrangement of an electronic transaction after the electronic transaction has been conducted according to an embodiment of the present disclosure.

FIG. 6 illustrates a process 600 for modifying the payment arrangement of an electronic transaction according to various embodiments of the disclosure. In some embodiments, at least a portion of the process 600 may be performed by the wallet module 132, the wallet application 116, and/or the payment card 312. The process 600 may begin by processing (at step 605) an electronic transaction for a first user account using a first payment arrangement. In some embodiments, the process 600 may be performed after receiving a request to process an electronic transaction through a user account. For example, the payment card 312 and/or the wallet application 116 may receive a request for conducting an electronic transaction through the user account of the user 140. In some embodiments, the wallet module 132 may determine (e.g., automatically or based on inputs by the user 140) a payment arrangement for conducting the electronic transaction. The payment arrangement may indicate one or more financial instruments to be used for the electronic transaction, allocations of portions of the payment to each of the one or more financial instruments, and a payment deferral arrangement. In some embodiments, no payment arrangement may be determined at the time the electronic transaction is conducted. Instead, the entire amount of the electronic transaction is initially allocated to the user account of the user 140 (and/or the wallet application). The wallet module 132 may create a receivable transaction record in the account database 136 indicating that the In some embodiments, after the electronic transaction is processed using funds from the service provider of the service provider server 130, the wallet module 132 may determine a payment arrangement for the electronic transaction as discussed herein. The wallet module 132 may then process one or more re-payment transactions according to the payment arrangement to charge one or more financial instruments of the user account for paying back the service provider. Upon completing the one or more re-payment transactions, the wallet module 132 may update (or remove) the receivable transaction record to indicate that the amount of the electronic transaction has been re-allocated to the user account of the user 140 (and/or the wallet application 116 of the user 140).

After processing the electronic transaction (and/or the re-payment transactions) using the first payment arrangement, the process 600 may determine (at step 610) a second payment arrangement for the electronic transaction. For example, the wallet module 132 may use the FI selection module 208 and the payment deferral module 206 to determine an optimal payment arrangement for the electronic transaction after the electronic transaction (and/or the initial re-payment transactions) was processed. The wallet module 132 may have acquired new information that may be used to determine the optimal payment arrangement after the electronic transaction was processed. In another example, the user 140 may have conducted the electronic transaction when the user device 110 has no or limited connectivity with the wallet module 132. After processing the electronic transaction (and/or the initial re-payment transactions), the wallet module 132 may determine another (a second) payment arrangement that is different from the first payment arrangement.

The process 600 then transmits (at step 615) a series of communication within the payment network and re-process (at step 620) the electronic transaction based on the series of communications. For example, the wallet manager 202 may transmit communications with various financial institutions (e.g., the acquiring banks, the issuing banks, etc.) associated with the payment arrangement within the payment network 260 to process re-payment transactions associated with the second payment arrangement. Based on the communications with the various financial institutions within the payment network 260, the wallet manager re-processes the electronic transaction using the new payment arrangement, without requiring any action from the payee (e.g., the merchant) of the electronic transaction. For example, the wallet module 132 may process the new re-payment transactions according to the second payment arrangement and may cancel the re-payment transactions according to the first payment arrangement using communications within the payment network 260, without requiring any actions from the merchant server 120. Thus, the modification of payment arrangement is completely transparent to the merchant of the merchant server 120. The wallet module 132 may also update the receivable transaction after the re-payment transactions are completed to indicate that the amount of the electronic transaction has been re-allocated from the financial instruments under the first payment arrangement to the financial instruments under the second payment arrangement. The process 600 then transmits (at step 625), to a use device of the first user account, a notification indicating a successful processing of the electronic transaction using the second payment arrangement.

Figure 7:
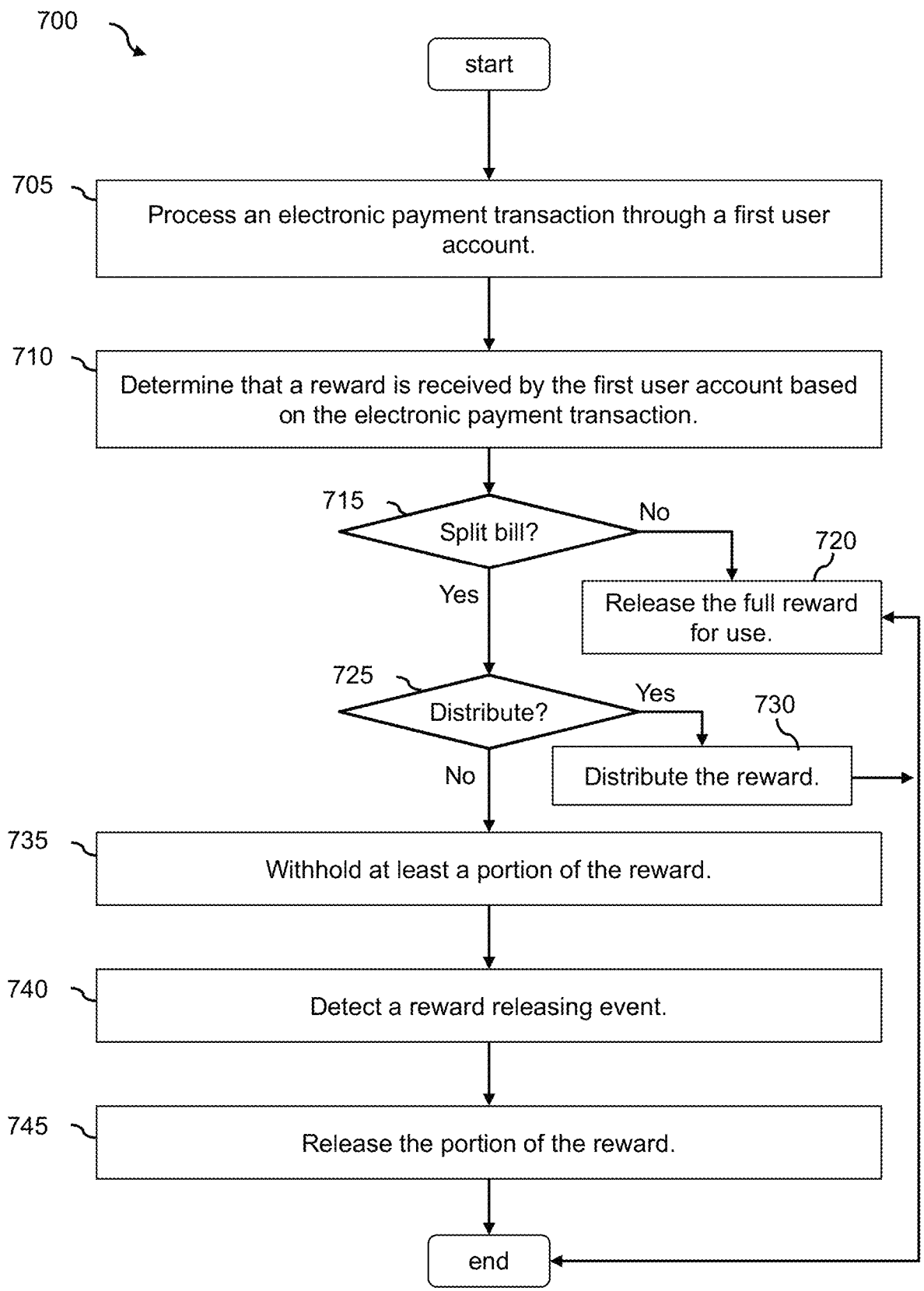
FIG. 7 is a flowchart showing a process of managing rewards for multiple user accounts according to an embodiment of the present disclosure.

FIG. 7 illustrates a process 700 for managing rewards of a user account according to various embodiments of the disclosure. In some embodiments, at least a portion of the process 700 may be performed by the wallet module 132 of the service provider server 130. The process 700 begins by processing (at step 705) an electronic transaction through a first user account. Similar to the step 605 of the process 600, the process of the electronic transaction may be triggered by a request for conducting the electronic transaction via the payment card 312 and/or the wallet application 116.

The process 700 determines (at step 710) that a reward is received by the first user account based on the electronic transaction. As discussed herein, the user account may receive rewards from one or more entities (e.g., the merchant, the financial instrument, the service provider, etc.) from conducting the electronic transaction. When the reward management module 210 determines that rewards are received by the user account, the reward management module 210 may store information related to the rewards (e.g., the electronic transaction linked to the rewards, the entity that offered the rewards, an amount, how to redeem, etc.) in a record of the account database 136 in association with the user account.

The process 700 then determines (at step 715) whether the electronic transaction linked to the reward is involved in a bill splitting arrangement. For example, the reward management module 210 may determine whether the electronic transaction that is linked to the reward is associated with one or more fund transfer transactions in which funds are transferred from user accounts of other users to the user account of the user 140. If one or more fund transfer transactions are associated with the electronic transaction, the reward management module 210 may determine that the electronic transaction is involved in a bill splitting arrangement.

If it is determined that the electronic transaction is not involved in a bill splitting arrangement, the process 700 releases (at step 720) the reward in its entirety for use by the user 140 through the user account. On the other hand, if it is determined that the electronic transaction is involved in a bill splitting arrangement, the process 700 determines (at step 725) if the reward can be distributed. For example, a cashback reward or a point reward may be distributed while a coupon for a subsequent purchase may not be easily distributed. If it is determined that the reward can be distributed, the process 700 distributes (at step 730) the reward.

On the other hand, if it is determined that the reward cannot be distributed, the process 700 withholds (at step 735) at least a portion of the reward. For example, the reward management module 210 may tag the reward that is shared among multiple user accounts but cannot be easily distributed. When the process 700 detects (at step 740) a reward releasing event, the process 700 releases (at step 745) the reward for use by the user account. For example, the reward management module 210 may release the reward based on one or more reward releasing event, such as a detection of user devices associated with the user accounts that share the reward within the user device 110 of the user account that holds the reward. The proximity of the user devices with the user device 110 may indicate that the user 140 may pay for a group event for the users again. In another example, the reward management module 210 may still enable the user 140 to select the reward for use in an electronic transaction. However, upon receiving the selection of the reward, the reward management module 210 may transmit authorization requests for use of the reward to the user devices associated with the user account that contributed to the electronic transaction linked to the reward. Upon receiving approval from the user devices, the reward management module 210 may release the reward for use by the user account.

Figure 8:
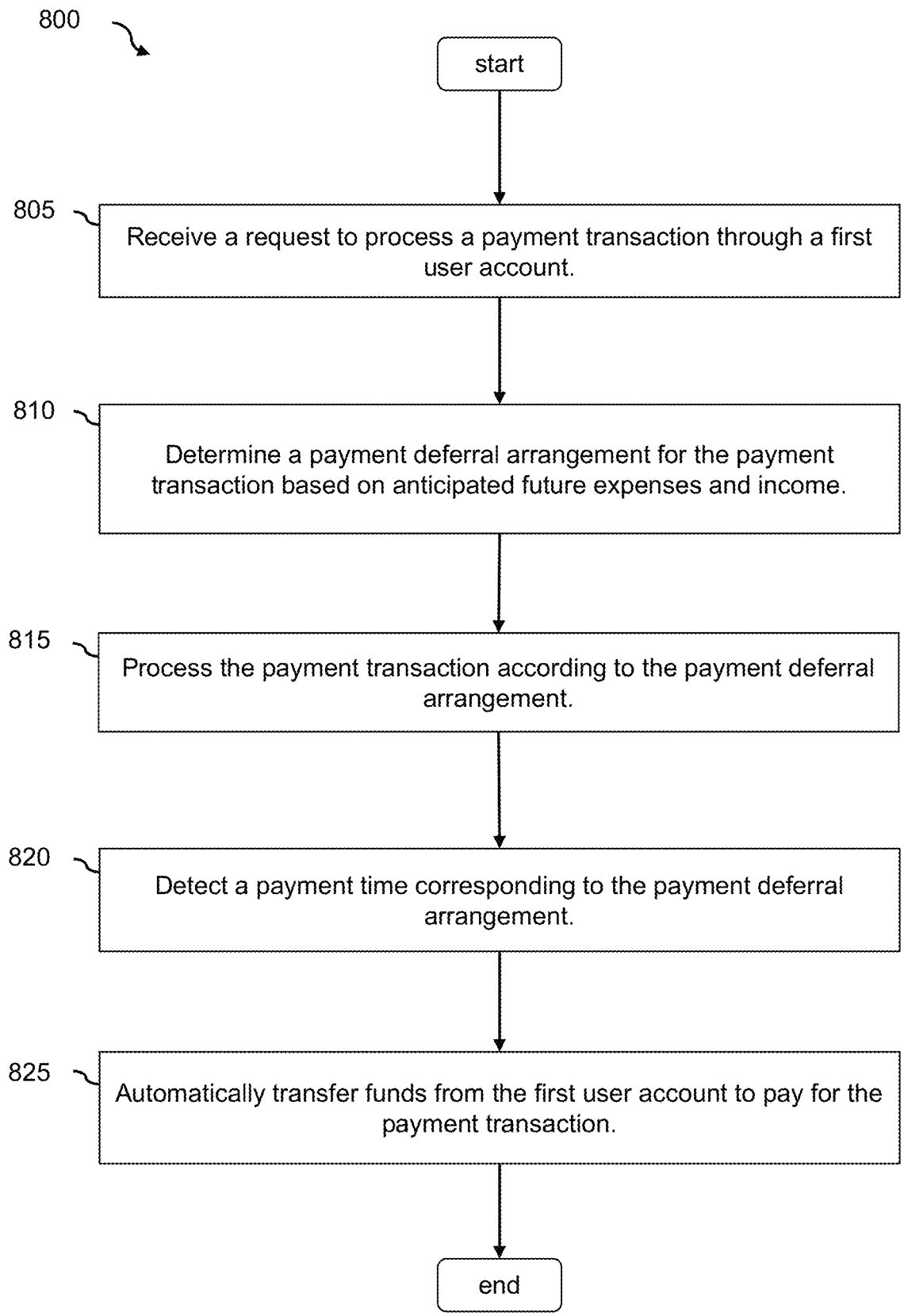
FIG. 8 is a flowchart showing a process of determining a payment deferral arrangement for an electronic transaction according to an embodiment of the present disclosure.

FIG. 8 illustrates a process 800 for managing a payment deferral arrangement for an electronic transaction according to various embodiments of the disclosure. In some embodiments, at least a portion of the process 800 may be performed by the wallet module 132 of the service provider server 130. The process 800 begins by receiving (at step 805) a request to process an electronic transaction through a first user account. For example, the payment card 312 and/or the wallet application 116 may receive a request for conducting an electronic transaction through the user account of the user 140.

The process 800 then determines (at step 810) a payment deferral arrangement for the electronic transaction based on anticipated further expenses and incomes. For example, the payment deferral module 206 may access data associated with the user account in the account database 136 and the wallet application 116 to determine if any planned expenses and income within a predetermined time period (e.g., within a day, 5 days, 2 weeks, etc.). If a sale transaction has been conducted through the user account, the payment deferral module 206 may determine that funds may be received by the user account within a short period of time. Furthermore, the payment deferral module 206 may determine any recurring expenses or incomes such as bills, periodic transfer of funds, based on historic transactions associated with the user account. In some embodiments, the payment deferral module 206 may determine the payment deferral arrangement for the electronic transaction to optimize the cash flow of the user account. Thus, when incoming funds are expected at a certain date, the payment deferral module 206 may delay the payment of the electronic transaction until after the certain date such that the incoming funds may be used for the electronic transaction.

On the other hand, if a large expense is expected to be conducted through the user account, the payment deferral module 206 may determine an installment plan for the electronic transaction to split the payment across multiple times. In some embodiments, the payment deferral module may group the large expense with the electronic transaction as a payment group and determine a payment deferral arrangement for the group of electronic transactions as a whole.

The process 800 then processes (at step 815) the electronic transaction according to the payment deferral arrangement. When the process 800 detects (at step 820) a payment time corresponding to the payment deferral arrangement, the process 800 automatically transfers (at step 825) funds from the user account to pay for the electronic transaction.

Figure 9:
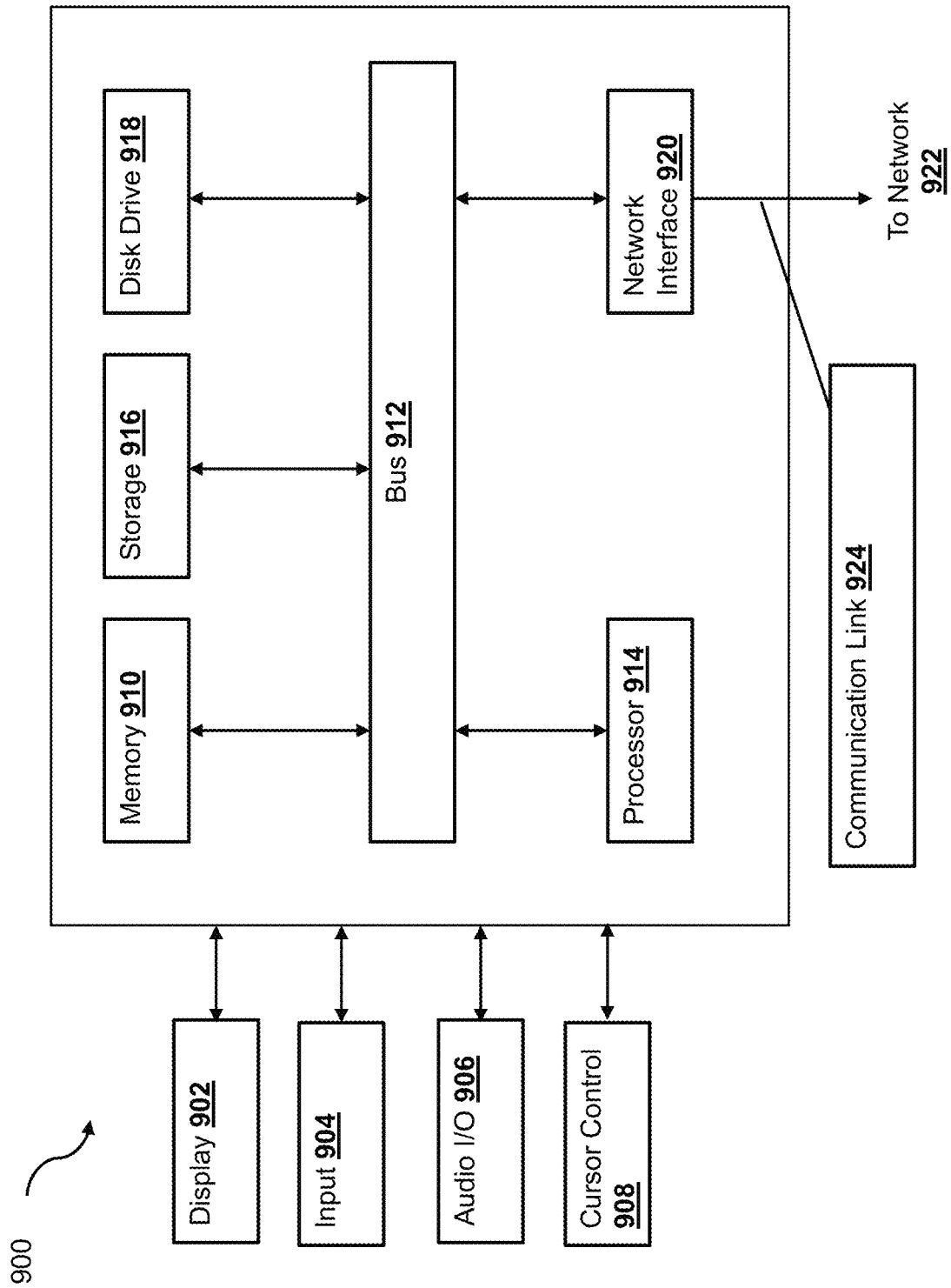
FIG. 9 is a block diagram of a system for implementing a device according to an embodiment of the present disclosure.

FIG. 9 is a block diagram of a computer system 900 suitable for implementing one or more embodiments of the present disclosure, including the service provider server 130, the merchant server 120, and the user devices 110, 180, and 190. In various implementations, each of the user devices 110, 180, and 190 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, 130, 180, and 190 may be implemented as the computer system 900 in a manner as follows.

The computer system 900 includes a bus 912 or other communication mechanism for communicating information data, signals, and information between various components of the computer system 900. The components include an input/output (I/O) component 904 that processes a user (i.e., sender, recipient, service provider) action, such as selecting keys from a keypad/keyboard, selecting one or more buttons or links, etc., and sends a corresponding signal to the bus 912. The I/O component 904 may also include an output component, such as a display 902 and a cursor control 908 (such as a keyboard, keypad, mouse, etc.). The display 902 may be configured to present a login page for logging into a user account or a checkout page for purchasing an item from a merchant. An optional audio input/output component 906 may also be included to allow a user to use voice for inputting information by converting audio signals. The audio I/O component 906 may allow the user to hear audio. A transceiver or network interface 820 transmits and receives signals between the computer system 900 and other devices, such as another user device, a merchant server, or a service provider server via a network 922, such as network 160 of FIG. 1. In one embodiment, the transmission is wireless, although other transmission mediums and methods may also be suitable. A processor 914, which can be a micro-controller, digital signal processor (DSP), or other processing component, processes these various signals, such as for display on the computer system 900 or transmission to other devices via a communication link 924. The processor 914 may also control transmission of information, such as cookies or IP addresses, to other devices.

The components of the computer system 900 also include a system memory component 910 (e.g., RAM), a static storage component 916 (e.g., ROM), and/or a disk drive 918 (e.g., a solid-state drive, a hard drive). The computer system 900 performs specific operations by the processor 914 and other components by executing one or more sequences of instructions contained in the system memory component 910. For example, the processor 914 can perform the payment management functionalities described herein according to the processes 600, 700, and 800.

Logic may be encoded in a computer readable medium, which may refer to any medium that participates in providing instructions to the processor 914 for execution. Such a medium may take many forms, including but not limited to, non-volatile media, volatile media, and transmission media. In various implementations, non-volatile media includes optical or magnetic disks, volatile media includes dynamic memory, such as the system memory component 910, and transmission media includes coaxial cables, copper wire, and fiber optics, including wires that comprise the bus 912. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 900. In various other embodiments of the present disclosure, a plurality of computer systems 900 coupled by the communication link 924 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
receiving, from an electronic payment tool associated with a first user and via a first network, transaction information associated with an electronic transaction between the first user and a merchant, wherein the transaction information comprises transaction data specific to the electronic transaction including a monetary amount associated with the electronic transaction;
receiving, via a payment network different from the first network, a first digital token corresponding to the electronic payment tool associated with the first user;
in response to receiving the first digital token, accessing a digital wallet associated with the electronic payment tool, wherein the digital wallet is linked to a plurality of financial instruments associated with the first user;
determining, from the plurality of financial instruments, a first financial instrument for processing the electronic transaction;
processing the electronic transaction using the digital wallet without transferring first funds from a funding account of the first financial instrument, wherein the processing the electronic transaction comprises:
creating a receivable record in an account database for storing the transaction information associated with the electronic transaction based on the first digital token received via the payment network, wherein the receivable record comprises allocation data indicating an initial allocation of the monetary amount associated with the electronic transaction to the first financial instrument associated with the digital wallet, and purchase data indicating at least one of an MCC code associated with the electronic transaction, a purchase category associated with the electronic transaction, or a merchant identifier of the merchant;
transmitting second funds from an account associated with the system in the monetary amount to the merchant; and
transmitting, to a merchant server associated with the merchant, a message indicating a successful processing of the electronic transaction;
subsequent to the processing the electronic transaction, determining a second financial instrument, from the plurality of financial instruments, for use in the electronic transaction;
in response to determining the second financial instrument for use in the electronic transaction, re-processing the electronic transaction using the second financial instrument via a series of commands transmitted within the payment network, wherein the re-processing the electronic transaction using the second financial instrument comprises charging at least a portion of the monetary amount to the second financial instrument for repaying the at least the portion of the monetary amount to the account associated with the system, wherein the charging comprises transmitting the series of commands to the payment network for transferring the at least the portion of the monetary amount from the second financial instrument to the account associated with the system and communicating the purchase data stored in the receivable record to an issuer host associated with the second financial instrument via the payment network;
updating the receivable record based on the re-processing of the electronic transaction using the second financial instrument; and
transmitting, to a user device associated with the first user, a notification indicating a completion of the re-processing of the electronic transaction using the second financial instrument.

2. The system of claim 1, wherein the determining the second financial instrument for use in the electronic transaction is based on at least one of the monetary amount associated with the electronic transaction or a rewards program associated with the second financial instrument.

3. The system of claim 1, wherein a delay of a first time period exists between the processing the electronic transaction and the re-processing the electronic transaction using the second financial instrument, and wherein the operations further comprise determining the delay of the first time period based on determining that an income will be received by the first user at the end of the first time period or determining a first amount of funds will become available on the second financial instrument by the end of the first time period.

4. The system of claim 1, wherein the operations further comprise:
 subsequent to the processing the electronic transaction, receiving, from the first user via the electronic payment tool, an input indicating a selection of a third financial instrument of the plurality of financial instruments for the re-processing the electronic transaction; and
 in response to the receiving the input from the first user, providing a notification to the first user indicating that the second financial instrument is an optimal financial instrument for the electronic transaction based on a set of criteria.

5. The system of claim 1, wherein the operations further comprise:
 determining a first amount of first rewards corresponding to the electronic transaction, wherein the first amount of the first rewards is allocated based on the first digital token being used to process the electronic transaction; and
 in response to the re-processing the electronic transaction, allocating the first amount of the first rewards to a rewards account associated with the first user.

6. The system of claim 1, wherein the re-processing the electronic transaction comprises charging a first portion of the monetary amount to the second financial instrument and charging a second portion of the monetary amount to a third financial instrument from the plurality of financial instruments.

7. The system of claim 6, the operations further comprising:
 determining the first portion and the second portion based on a first available amount on the second financial instrument, a second available amount on the third financial instrument, a first rewards program associated with the second financial instrument, and a second rewards program associated with the third financial instrument.

8. The system of claim 1, the operations further comprising:
 detecting an indication to split the electronic transaction with a second user;
 determining a first rewards amount corresponding to the first user and a second rewards amount corresponding to the second user; and
 in response to detecting a payment from the second user to the first user corresponding to the electronic transaction, allocating the second rewards amount to a rewards account associated with the second user.

9. A method comprising:
 receiving, by one or more hardware processors associated with a service provider and from an electronic payment tool associated with a user and via a first network, transaction information associated with an electronic transaction between the user and a merchant, wherein the transaction information comprises transaction data specific to the electronic transaction;
 receiving, by the one or more hardware processors, a first digital token corresponding to the electronic payment tool associated with the user via a payment network different from the first network;
 accessing, by the one or more hardware processors, a digital wallet associated with the electronic payment tool based on the first digital token, wherein the digital wallet is linked to a plurality of financial instruments associated with the user;
 determining, by the one or more hardware processors from the plurality of financial instruments, a first financial instrument for processing the electronic transaction;
 processing, by the one or more hardware processors, the electronic transaction using the digital wallet without transferring first funds from a funding account of the first financial instrument, wherein the processing the electronic transaction comprises:
  creating a receivable record in an account database for storing the transaction data specific to the electronic transaction based on the first digital token received via the payment network, wherein the receivable record comprises allocation data indicating an allocation of a monetary amount corresponding to the electronic transaction to the first financial instrument associated with the digital wallet, and purchase data indicating at least one of an MCC code associated with the electronic transaction, a purchase category associated with the electronic transaction, or a merchant identifier of the merchant;
  transmitting, to the merchant, second funds from an account associated with the service provider in the monetary amount corresponding to the electronic transaction to the merchant; and
  transmitting, to a merchant server associated with the merchant, a message indicating a successful processing of the electronic transaction;
 subsequent to the processing the electronic transaction to the digital wallet, determining, by the one or more hardware processors, a second financial instrument, from the plurality of financial instruments, for use in the electronic transaction;
 re-processing, by the one or more hardware processors, the electronic transaction using the second financial instrument, wherein the re-processing the electronic transaction using the second financial instrument comprises transmitting one or more software instructions to the payment network for transferring at least a portion of the monetary amount from the second financial instrument to the account associated with the service provider, and communicating the purchase data stored in the receivable record to an issuer host associated with the second financial instrument via the payment network;
 updating, by the one or more hardware processors, the receivable record based on the re-processing of the electronic transaction using the second financial instrument; and transmitting, by the one or more hardware processors to a user device associated with the user, a notification indicating a completion of the re-processing of the electronic transaction using the second financial instrument.

10. The method of claim 9, wherein the determining the second financial instrument for use in the electronic transaction is based on at least one of an available transactable amount associated with the second financial instrument, a purchase type associated with the electronic transaction, or a rewards program associated with the second financial instrument.

11. The method of claim 9, wherein a delay of a first time period exists between the processing the electronic transaction and the re-processing the electronic transaction using the second financial instrument, and wherein the method further comprises determining that a first amount of funds will become available for use on the second financial instrument by the end of the first time period.

12. The method of claim 9, further comprising:
subsequent to the processing the electronic transaction, receiving, from the user, an input indicating a selection of a third financial instrument of the plurality of financial instruments for the re-processing the electronic transaction; and
providing a notification on the user device indicating that the second financial instrument is determined to be an optimal financial instrument for the electronic transaction.

13. The method of claim 9, further comprising:
subsequent to the processing the electronic transaction, receiving, from the user, an input indicating a selection of a third financial instrument of the plurality of financial instruments for the re-processing the electronic transaction; and
allocating a first portion of the monetary amount to the second financial instrument based on a first available amount on the second financial instrument and allocating a second portion of the monetary amount to the third financial instrument based on a second available amount on the third financial instrument.

14. The method of claim 9, further comprising:
determining a first amount of first rewards corresponding to the electronic transaction, wherein the first amount of the first rewards is determined based on the allocation of the monetary amount to the first financial instrument; and
in response to the re-processing the electronic transaction using the second financial instrument, modifying the first amount of the first rewards.

15. A non-transitory machine-readable medium having stored thereon machine-readable instructions executable to cause a machine to perform operations comprising:
receiving, from an electronic payment tool associated with a user and via a first network, transaction information associated with an electronic transaction between the user and a merchant, wherein the transaction information comprises transaction data specific to the electronic transaction;
receiving a first digital token corresponding to the electronic payment tool associated with the user via a second network different from the first network;
in response to receiving the first digital token, accessing a digital wallet associated with the electronic payment tool, wherein the digital wallet is linked to a plurality of financial instruments associated with the first user;
determining, from the plurality of financial instruments, a first financial instrument for processing the electronic transaction;
processing the electronic transaction using the digital wallet without transferring first funds from a funding account of the first financial instrument, wherein the processing the electronic transaction comprises:
creating a receivable record in a database for storing the transaction information associated with the electronic transaction based on the first digital token received via the second network, wherein the receivable record comprises allocation data indicating an initial allocation of the monetary amount associated with the electronic transaction to the first financial instrument associated with the digital wallet, and purchase data indicating at least one of an MCC code associated with the electronic transaction, a purchase category associated with the electronic transaction, or a merchant identifier of the merchant;
transferring, to the merchant, second funds from an account associated with a service provider in the monetary amount to the merchant; and
transmitting, to a merchant server associated with the merchant, a message indicating a successful processing of the electronic transaction;
subsequent to the processing the electronic transaction, determining a second financial instrument, from the plurality of financial instruments, for use in the electronic transaction;
re-processing the electronic transaction using the second financial instrument, wherein the re-processing the electronic transaction using the second financial instrument comprises transmitting one or more software instructions to the second network for transferring at least a portion of the monetary amount from the second financial instrument to the account associated with the service provider for repaying the at least the portion of the monetary amount to the account associated with the service provider, and communicating the purchase data stored in the receivable record to an issuer host associated with the second financial instrument via the second network; and
updating the receivable record based on the re-processing of the electronic transaction using the second financial instrument.

16. The non-transitory machine-readable medium of claim 15, wherein the determining the second financial instrument for use in the electronic transaction is based on at least one of the monetary amount associated with the electronic transaction or a rewards program associated with the second financial instrument.

17. The non-transitory machine-readable medium of claim 15, wherein the operations further comprise:
subsequent to the processing the electronic transaction, receiving, from the user, an input indicating a selection of a third financial instrument of the plurality of financial instruments for the re-processing the electronic transaction; and
in response to the receiving the input from the user, providing a notification to the user indicating that the second financial instrument is determined to be an optimal financial instrument for the electronic transaction.

18. The non-transitory machine-readable medium of claim 15, wherein a delay of a first time period exists between the processing the electronic transaction with the first digital token and the re-processing the electronic transaction using the second financial instrument, and wherein the operations further comprise determining the delay of the first time period based on determining that an income will be received by the user at the end of the first time period or determining a first amount of funds will become available on the second financial instrument by the end of the first time period.

19. The non-transitory machine-readable medium of claim 15, wherein the operations further comprise:
   determining a first amount of first rewards corresponding to the electronic transaction, wherein the first amount of first rewards is allocated based on the first digital token being used to process the electronic transaction; and
   in response to the re-processing the electronic transaction, allocating the first amount of first rewards to a rewards account associated with the user.

20. The non-transitory machine-readable medium of claim 15, wherein the re-processing the electronic transaction further comprises charging a first portion of the monetary amount to the second financial instrument and charging a second portion of the monetary amount to a third financial instrument of the plurality of financial instrument.

* * * * *